United States Patent [19]

Kobayashi

[11] Patent Number: 4,622,817
[45] Date of Patent: Nov. 18, 1986

[54] HYDRAULIC ASSIST TURBOCHARGER SYSTEM AND METHOD OF OPERATION

[75] Inventor: Robert J. Kobayashi, Rancho Palos Verdes, Calif.

[73] Assignee: The Garrett Corporation, Los Angeles, Calif.

[21] Appl. No.: 650,911

[22] Filed: Sep. 14, 1984

[51] Int. Cl.[4] .......................................... F02B 37/00
[52] U.S. Cl. ...................... 60/608; 184/6.22; 415/38; 415/176
[58] Field of Search ................ 60/39.08, 607, 608; 184/6.11, 6.22; 123/142.5 R; 415/44, 45, 38, 175, 176, 177; 417/407

[56] References Cited

U.S. PATENT DOCUMENTS

| | | |
|---|---|---|
| 2,173,595 | 9/1939 | Schutte . |
| 2,386,096 | 10/1945 | Ehrling . |
| 2,578,028 | 12/1951 | Udale . |
| 2,585,029 | 2/1952 | Nettel . |
| 2,585,968 | 2/1952 | Schneider . |
| 2,898,731 | 8/1959 | Barr . |
| 2,968,914 | 1/1961 | Birmann .............................. 60/608 |
| 3,005,306 | 10/1961 | Bush . |
| 3,036,563 | 5/1962 | Garcea . |
| 3,099,385 | 7/1963 | Elford . |
| 3,107,483 | 10/1963 | Hamilton .............................. 60/605 |
| 3,114,360 | 12/1963 | Snelling ........................ 184/6.22 X |
| 3,321,910 | 5/1967 | Davies et al. ...................... 60/39.08 |
| 3,330,935 | 7/1967 | Wells ....................... 123/142.5 R X |
| 3,355,877 | 12/1967 | Chaffiotte . |
| 3,389,544 | 6/1968 | Wolf . |
| 3,469,072 | 9/1969 | Carlson ..................... 123/142.5 R X |
| 3,473,322 | 10/1969 | Wolf . |
| 3,475,907 | 11/1969 | Kellett . |
| 3,498,052 | 3/1970 | Silvern . |
| 3,601,506 | 8/1971 | Griswold . |
| 3,723,018 | 3/1973 | Uchiyama et al. ................ 415/38 X |
| 3,869,866 | 3/1975 | Timoney .............................. 60/607 |
| 3,921,403 | 11/1975 | McInerney et al. . |
| 3,927,530 | 12/1975 | Braun .................................. 60/607 |
| 4,002,027 | 1/1977 | Eley . |
| 4,073,140 | 2/1978 | Lang et al. . |
| 4,083,188 | 4/1978 | Kumm ............................. 60/608 X |
| 4,204,405 | 5/1980 | Basham . |
| 4,285,200 | 8/1981 | Byrne et al. ........................ 60/607 |
| 4,322,949 | 4/1982 | Byrne et al. ..................... 60/607 X |
| 4,444,014 | 4/1984 | Kobayashi et al. ................. 60/608 |

Primary Examiner—Michael Koczo
Attorney, Agent, or Firm—Stuart O. Lowry; Albert J. Miller

[57] ABSTRACT

An improved hydraulic assist turbocharger system is provided of the type having an hydraulic turbine for supplementally driving a turbocharger during selected engine operating conditions when supplemental air flow to the engine is required. The improved system is adapted for improved engine starting during cold weather conditions by increasing the pressure of hydraulic fluid supplied to the hydraulic turbine during engine cranking and/or decreasing the viscosity of said hydraulic fluid, thereby accelerating the turbocharger rapidly to a rotational speed for supplying sufficient air flow to the engine for starting purposes. In one form, the improved system further includes a pilot controller for regulating supply of hydraulic fluid to the hydraulic turbine to control engine air inflow, wherein the pilot controller is responsive to command signals from a master control unit which also controls engine fuel flow in accordance with a predetermined air-fuel ratio schedule throughout a range of engine operating conditions.

103 Claims, 9 Drawing Figures

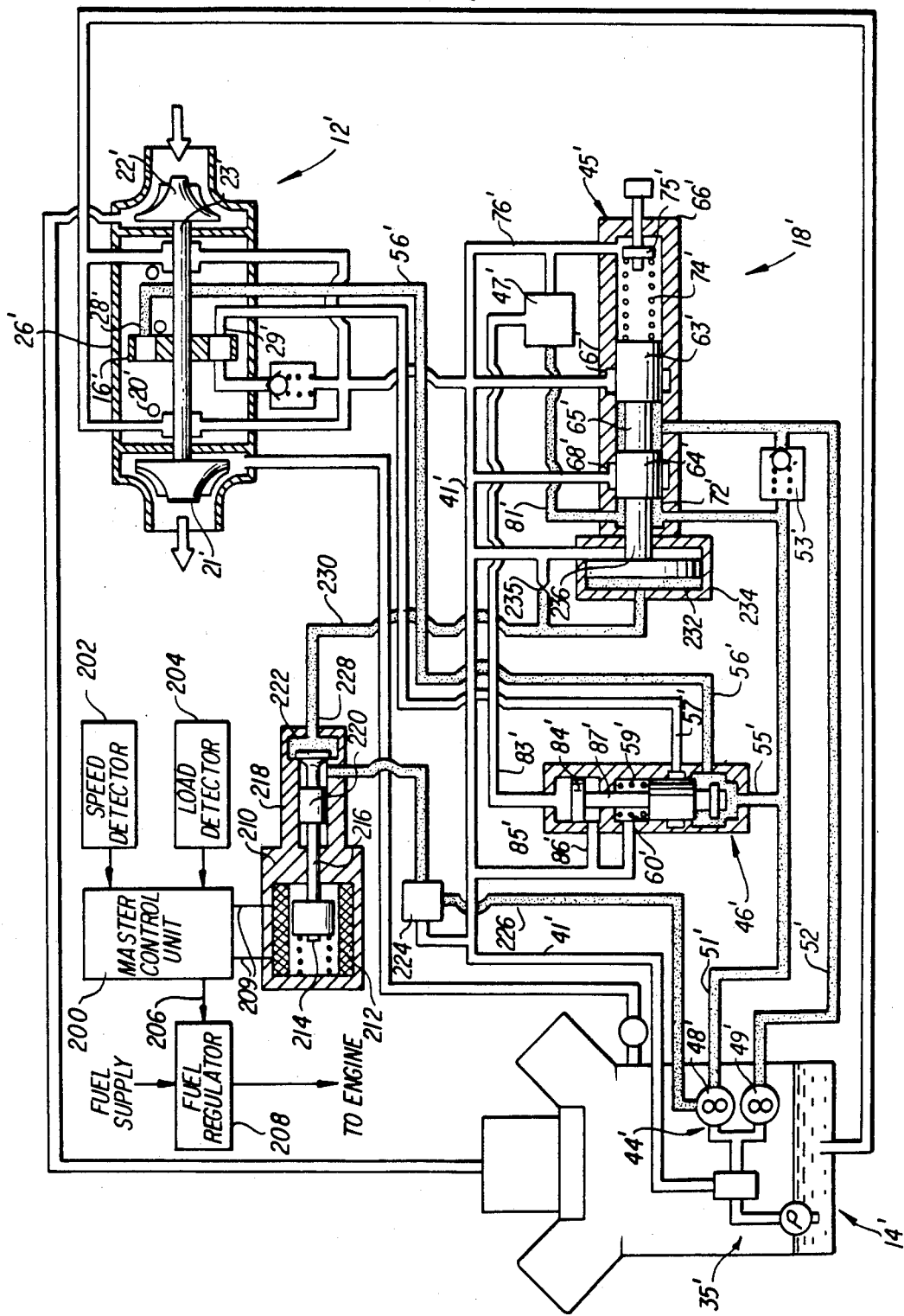

HYDRAULIC ASSIST TURBOCHARGER SYSTEM AND METHOD OF OPERATION

This invention relates generally to turbocharged engine systems of the type including a so-called hydraulic assist or three-wheel turbocharger. More particularly, this invention relates to an improved hydraulic assist turbocharger system of the general type described in U.S. Pat. Nos. 4,285,200 and 4,444,014, wherein the improved system is designed for facilitated starting during cold weather conditions and further for close scheduling of air-fuel ratio supplied to the engine throughout a range of operating conditions.

Turbochargers are well known for use in supplying a combustion engine with a charge of air under pressure, commonly referred to as charge air. A turbocharger typically comprises a turbine wheel and a compressor wheel mounted on a common shaft for rotation as a unit. The turbine and compressor wheels are positioned respectively within turbine and compressor housings, which are secured to turn onto opposite ends of a so-called center housing including appropriate bearings for rotatably supporting the common shaft. In operation, exhaust gases from a combustion engine are coupled for passage through the turbine housing to rotatably drive the turbine wheel, whereby the turbine wheel correspondingly drives the compressor wheel to draw in and compress ambient air for supply as charge air to the engine.

Turbocharged engines are highly advantageous when compared with conventional naturally aspirated engines in that air is delivered with increased density to the combustion chamber or cylinders of the engine. This increased air density results in an increased mass flow of available air for combustion to enable the engine to operate at substantially higher performance levels and with greater efficiency. However, an inherent limitation upon turbocharged engines has been the inability of the turbocharger to provide the engine with sufficient charge air during some operating conditions. For example, the quantity of charge air supplied by the turbocharger during low speed engine operation is typically insufficient to accommodate relatively high loads and/or relatively rapid engine accelerations. Moreover, particularly in a two-cycle engine, the charge air supplied by the turbocharger during engine cranking for starting purposes and/or during other low speed operating conditions is normally inadequate to start the engine or to keep the engine from stalling.

A variety of turbocharger system concepts are known for boosting or supplementing the normal output of charge air from a turbocharger during selected engine operating conditions. For example, auxiliary combustor systems have been proposed for increasing the energy level of engine exhaust and other gases supplied to the turbocharger for supplementally driving the turbocharger during certain engine operating conditions. Compound turbocharger systems have also been proposed with multiple turbine and/or compressor components coupled together to provide supplemental charge air. Additional system concepts include, for example, mechanical drive trains and hydraulic drive arrangements for increasing turbocharger rotational speed in an effort to increase the charge air output.

System concepts of particular note are described in detail in commonly assigned to U.S. Pat. Nos. 4,285,200 and 4,444,014, wherein a nonventilated hydraulic turbine is mounted on a turbocharger shaft within the center housing at a position between the turbine and compressor wheels. This nonventilated hydraulic turbine is supplied with hydraulic fluid under pressure during certain engine operating conditions to supplementally drive the turbocharger, thereby increasing the charge air output supplied to the engine.

While the hydraulic assist systems described in the above-referenced patents offer significant advantages in a wide variety of engine applications, engine starting can be relatively difficult due to inadequate supply of charge air to the engine during cranking by a starter motor or the like. Such starting difficulties are particularly pronounced in two-cycle engines and/or diesel-fueled engines requiring substantial quantities of charge air for starting purposes. These starting difficulties are further compounded during cold weather conditions due to the temperature-dependent increased viscosity of the hydraulic fluid, wherein the fluid viscosity can prevent the turbocharger from rotating at a speed sufficient to provide the required flow of charge air. Moreover, while such hydraulic assist systems have provided substantially improved engine transient response and overall useful speed range, they have not optimized engine air-fuel ratio for maximum fuel economy and minimum toxic exhaust emissions over a broad range of engine operation.

There exists, therefore, a significant need for an improved hydraulic assist turbocharger system of the general type described in U.S. Pat. Nos. 4,285,200 and 4,444,014, wherein the improved system is adapted for reliable starting during cold weather conditions and for closely scheduling engine air-fuel ratio throughout a range of operating conditions. The present invention fulfills these needs and provides further related advantages.

SUMMARY OF THE INVENTION

An improved hydraulic assist turbocharger system is provided of the type including a so-called three-wheel or hydraulic assist turbocharger for controlled supply of charge air to a combustion engine. The turbocharger includes turbine and compressor wheels mounted on a common shaft and disposed respectively within turbine and compressor housings, with the shaft being rotatably supported by appropriate shaft bearings within an intermediate center housing. A nonventilated hydraulic turbine is carried by the turbocharger shaft within the center housing and is controllably supplied with hydraulic fluid under pressure for supplementally driving the turbocharger to provide increased charge air supply to the engine. The hydraulic fluid is preferably obtained from and shared with an engine lubrication system, and a control valve responsive to engine operating conditions, such as speed and load, is provided for regulating the supply of hydraulic fluid to the hydraulic turbine in accordance with engine air flow requirements.

In accordance with the invention, the hydraulic assist turbocharger system includes means for increasing the pressure of hydraulic fluid supplied to the hydraulic turbine during engine cranking for starting purposes, thereby obtaining a relatively higher turbocharger rotating speed and correspondingly increased supply of charge air to the engine for easier starting. This means for increasing the hydraulic fluid pressure may be combined with means for decreasing the viscosity of the hydraulic fluid during an engine starting procedure to reduce sticking of the shaft bearings and to increase the mass flow rate of hydraulic fluid supplied to the hydraulic turbine. This increased fluid flow rate results in a more rapid turbocharger acceleration to a relatively higher rotational speed, thereby substantially increasing the charge air supplied to the engine. In addition, in one form, the improved hydraulic assist turbocharger system of the invention includes means for scheduling engine fuel flow and engine air flow to obtain optimum air-fuel ratios throughout a broad range of operating conditions.

In accordance with one preferred form of the invention, the hydraulic turbine is associated with two or more nozzles, or nozzle sets, through which the hydraulic fluid may be separately supplied for rotatably driving the hydraulic turbine. A selector valve responds to engine cranking by a starter motor or the like during a starting procedure for limiting the number of nozzles or nozzle sets through which the hydraulic fluid is supplied for driving the hydraulic turbine. This limitation effectively reduces the total nozzle area through which the hydraulic fluid is discharged, thereby increasing the pressure of the hydraulic fluid discharged into driving engagement with the hydraulic turbine to result in a more rapid acceleration of the turbocharger to a relatively higher rotational speed capable of supplying the engine with sufficient charge air for starting. As soon as the engine starts, the selector valve opens the remaining nozzles or nozzle sets to hydraulic fluid flow into driving engagement with the hydraulic turbine.

The viscosity of the hydraulic fluid supplied to the turbocharger is advantageously decreased during cold weather starting by one or more heating elements, preferably of the electrical resistance type, for increasing the temperature of the center housing and turbocharger shaft bearings prior to a starting procedure. In one preferred form, separate heating elements are provided for elevating the temperature of the center housing in the vicinities of each turbocharger shaft bearing and the flow path through which the fluid passes to be selected nozzles or nozzle set during engine cranking. The center housing comprises a heat sink for storing thermal energy which is transmitted to the shaft bearings and further to incoming hydraulic fluid upon initiation of engine cranking. The hydraulic fluid, a portion of which is used to lubricate the shaft bearings, is thus increased in temperature for insuring relatively rapid initiation of shaft rotation and a correspondingly rapid acceleration to a relatively high rotational speed capable of supplying the engine with sufficient charge air for starting purposes.

In accordance with one aspect of the invention, the hydraulic turbine and the associated nozzles are installed within the center housing in a manner conducive to facilitated, high production turbocharger assembly. More particularly, the hydraulic turbine is formed by a plurality of vanes projecting radially outwardly at one end of an axially elongated turbine sleeve shaped for secure attachment onto the turbocharger shaft by press-fitting or the like. The nozzles are defined by a plurality of small openings in a radially projecting wall on an axially elongated nozzle sleeve shaped for secured attachment as by press-fitting into a center housing bore in slight running clearance with the turbocharger shaft. When installed, the nozzle openings are positioned closely adjacent the vanes of the hydraulic turbine, with the nozzle and turbine sleeves respectively cooperating with the center housing to define two or more inflow chambers through which hydraulic fluid is supplied to the nozzle openings and an outflow chamber within which the hydraulic turbine is positioned.

In one form of the invention, the system includes a master control unit for maintaining a closely scheduled air-fuel ratio throughout a range of engine operating conditions. The master control unit preferably comprises a preprogrammed electronic module responsive to engine operating conditions, for example, speed and load, and for providing command signals to the control valve of the hydraulic assist system and also to a fuel flow regulator to control engine air-fuel ratio. In a preferred form, the command signals are coupled to a pilot controller which couples a pressure-regulated pilot fluid to a control piston forming a portion of the system control valve. The magnitude of the pilot fluid pressure modulates the position of the control valve to regulate supply of hydraulic fluid to the hydraulic turbine. Accordingly, engine air inflow is controlled simultaneously with engine fuel flow.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 9 is a schematic diagram illustrating an alternative form of an hydraulic assist turbocharger system embodying the novel features of the invention.

DETAILED DESCRIPTION OF THE PREFERRED EMBODIMENTS

Figure 1:
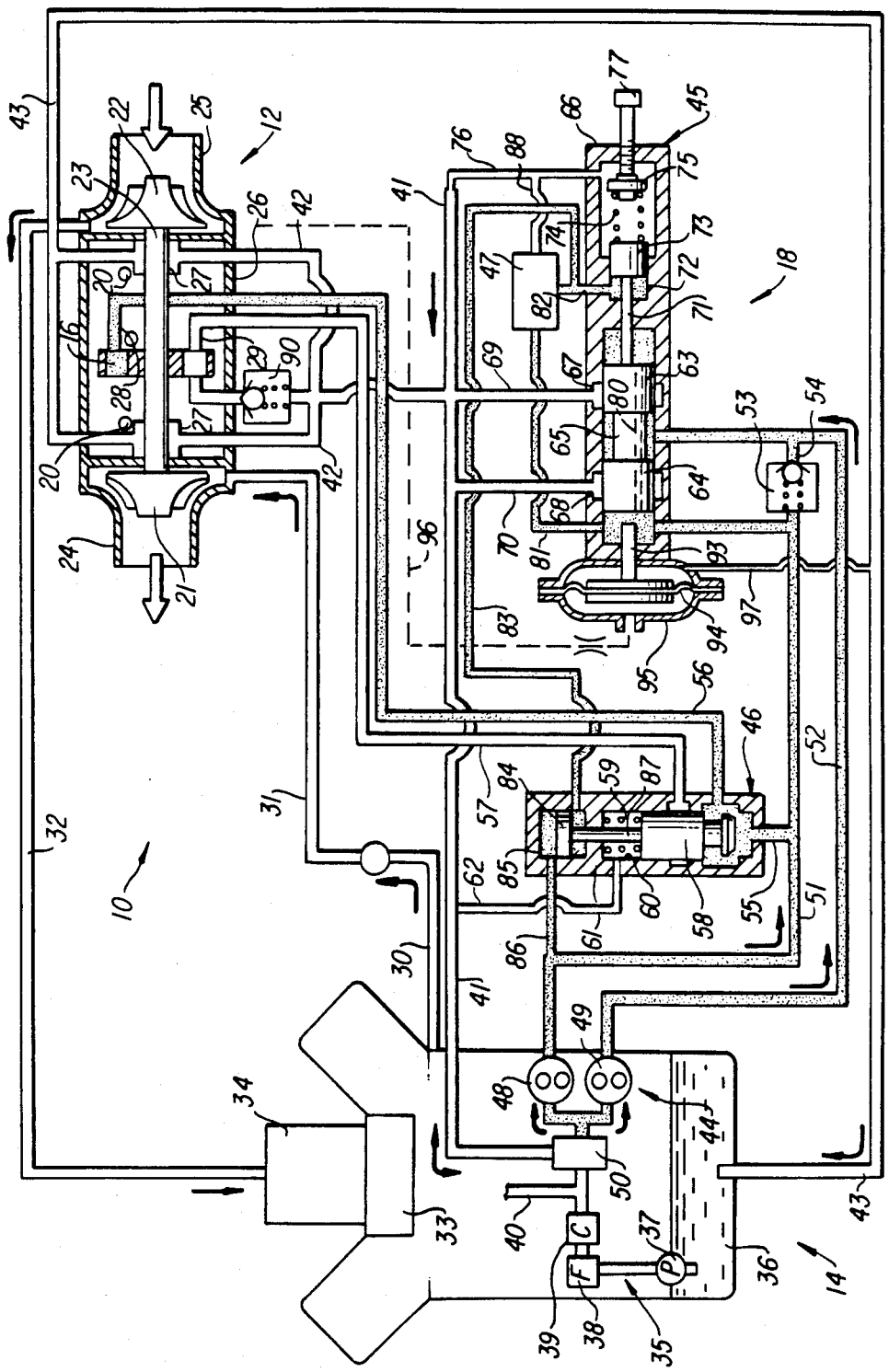
FIG. 1 is a schematic diagram illustrating an hydraulic assist turbocharger system embodying novel features of the invention, and showing the system in an engine starting mode.

An improved hydraulic assist turbocharger system embodying one form of the invention is shown schematically in FIG. 1 and is referred to generally by the reference numeral 10. The hydraulic assist turbocharger system 10 includes a so-called hydraulic assist or three-wheel turbocharger 12 for supplying air under pressure to a combustion engine 14, wherein the turbocharger includes a nonventilated hydraulic turbine 16. The hydraulic turbine 16 is adapted to be rotatably driven by an hydraulic fluid under the control of a fluid control system 18 to supplementally drive the turbocharger 12 for increased air flow to the engine 14 during selected engine operating conditions. In accordance with the invention, the system 10 shown in FIG. 1 is adapted for facilitated and reliable starting particularly during cold weather conditions by increasing the pressure and further by decreasing the viscosity of hydraulic fluid supplied to the hydraulic turbine 16 during an engine starting procedure. In addition, the system may be readily adapted in an alternative form, as shown in FIG. 9, for close simultaneous scheduling of engine air and fuel flows to optimize efficiency with minimum toxic emissions.

The illustrative hydraulic assist turbocharger system 10 shown in FIG. 1 comprises an improvement upon the systems shown and described in commonly assigned U.S. Pat. Nos. 4,285,200 and 4,444,014. More particularly, the improved system 10 is designed for controlled supplementation of the normal charge air output of a turbocharger to increase the air mass inflow to a combustion engine 14, such as a conventional two-cycle or four-cycle reciprocating piston engine. Such supplemental turbocharger driving is particularly desirable during low-speed engine operation to permit accommodation of relatively high engine loads and further to permit relatively rapid engine accelerations. Moreover, in a two-cycle engine especially of the diesel-fueled type, supplemental turbocharger driving is required to prevent engine stalling during low-speed operating conditions.

The improved system 10 of the present invention further expands the capabilities and versatility of the systems described in the above-referenced U.S. Pat. Nos. 4,285,200 and 4,444,014 by insuring facilitated engine starting including during cold weather conditions without requiring additional starting components, such as mechanically driven blowers, booster pumps, air accumulators, and the like. Instead, the fluid control system 18 responds to engine cranking by a starter motor (not shown) or the like during a starting procedure to increase the relative pressure of the hydraulic fluid supplied to the hydraulic turbine 16 and thereby accelerate the turbocharger 12 to a relatively higher rotational speed for supplying a sufficient air mass inflow to the engine 14 for starting purposes. In addition, or in the alternative, heating elements 20 are incorporated directly into the turbocharger 12 for decreasing hydraulic fluid viscosity during cold weather conditions, thereby insuring rapid initiation of turbocharger rotation and rapid turbocharger acceleration to a high rotating speed during a starting procedure.

In general, the improved hydraulic assist turbocharger system 10 shown in FIG. 1 includes a number of system components corresponding in form and operation with the systems described in the aforesaid U.S. Pat. Nos. 4,285,200 and 4,444,014, which are incorporated by reference herein. More particularly, the three-wheel turbocharger 12 comprises a turbine wheel 21 and a compressor wheel 22 connected to the opposite ends of a common shaft 23 and received respectively within a turbine housing 24 and a compressor housing 25. The turbine and compressor housings 24 and 25 are interconnected by a center housing 26 including shaft bearings 27, such as appropriate journal and thrust bearings, for rotatably supporting the turbocharger shaft 23, all in a well-known manner. The nonventilated hydraulic turbine 16 is supported for rotation with the shaft 23 at a position within the center housing 26 in close association with hydraulic fluid nozzles or nozzle sets, with the improved system 10 including at least two separate nozzles or nozzle sets, as referenced by numerals 28 and 29 in FIG. 1. The hydraulic fluid under pressure is supplied via the fluid control system 18 through these nozzles 28 and 29 into driving communication with the hydraulic turbine 16 whenever supplemental turbocharger driving is required, as will be described.

In operation, the turbocharger turbine wheel 21 is rotatably driven by exhaust gases expelled from the combustion engine 14 through an exhaust gas manifold 30 and an exhaust conduit 31 coupled to the turbine housing 24. The rotating turbine wheel 21 rotatably drives the turbocharger shaft 23 and the compressor wheel 22 whereby the compressor wheel draws in and compresses ambient air. This compressed ambient air comprises so-called boost or charge air which is supplied to the engine 14 via a charge air conduit 32 to an air intake manifold 33. Conveniently, as shown in FIG. 1, a charge air cooler heat exchanger 34 of conventional design may be provided along the conduit 32 to cool the compressed charge air so as to reduce the total engine heat load and to further increase the air density. This relatively high density charge air supplied to the engine enables the engine to operate at a relatively high performance and efficiency level.

The combustion engine 14 conventionally includes an hydraulic pumping system 35 for providing a lubricant, such as motor oil, to the engine and to the turbocharger 12 for lubrication purposes, wherein this lubricant conveniently is shared with the fluid control system 18 for rotatably driving the hydraulic turbine 16. More specifically, the pumping system 35 normally includes a main oil sump 36 from which oil is pumped by a relatively low-pressure engine-driven oil pump 37 to the engine and the turbocharger. As shown in FIG. 1, the oil is pumped through an oil filter 38, an oil cooler 39, and an appropriate network of passages as indicated by a conduit 40 to engine components requiring lubrication. The oil is also coupled through an oil supply conduit 41 to the center housing 26 of the turbocharger 12 for lubrication of the turbocharger bearings 27 via a network of appropriate passages indicated in FIG. 1 by conduits 42 which can be partially or wholly formed within the center housing. The oil passes through communication with the bearings 27, typically by means of a gravity-drain system, and is returned to the sump 36 by a sump return conduit 43.

During engine operating conditions requiring supplemental driving of the turbocharger 12, the fluid control system 18 pumps a portion of the lubricating oil under controlled pressure conditions into driving communication with the hydraulic turbine 16 on the turbocharger shaft 23. In the preferred form, as depicted in FIG. 1, the oil is pumped to the center housing 26 by a high pressure pump assembly 44 at a flow rate generally directly proportional to engine rotational speed. A dual function control valve 45 and a selector valve 46 regulate the pressure and flow rate of the hydraulic fluid delivered to the center housing 26 by unloading an appropriate portion of the fluid to control the level of supplemental driving of the turbocharger 12 and thereby control the mass flow of charge air to the engine. Importantly, the control valve 45 and the selector valve 46 respond to a number of engine operating conditions, particularly such as speed and load, to regulate the level or the presence of supplemental turbocharger driving in accordance with actual engine air inflow requirements.

Pursuant to one major aspect of the invention, a mode control switch 47 is included in the fluid control system 18 for temporarily altering or overriding the normal operation of the dual function control valve 45 and the selector valve 46 during an engine starting procedure in a manner insuring easier engine starting. Such facilitated engine starting is obtained by controlling the system valves 45 and 46 to temporarily increase the pressure of hydraulic fluid supplied to the hydraulic turbine 16 during engine cranking for starting purposes, resulting in faster acceleration of the turbocharger 12 to a relatively higher rotational speed for supplying a high and sufficient charge air flow to the engine for starting. In addition, the mode control switch 47 can also be used to alter or override normal operation of the control and selector valves 45 and 46 in a manner obtaining enhanced engine performance during a transient response condition requiring, for example, heavy engine acceleration.

More specifically, the high pressure pump assembly 44 comprises a pair of positive displacement pumps 48 and 49, such as gear pumps or the like, having intakes coupled in common to a relatively small sump 50 at the discharge side of the low pressure engine oil pump 37. These positive displacement pumps 48 and 49, which can be provided in any suitable number, are preferably formed as part of a single gear pump unit or assembly driven by the engine as by a suitable mechanical connection to the engine crankshaft (not shown) or the like. The two pumps 48 and 49 thus provide separate hydraulic flow outputs which may be equal and which have flow rates directly proportional to engine speed. These separate flow outputs are coupled respectively through a pair of flow conduits 51 and 52 to the dual function control valve 45. During many engine operating conditions, the control valve 45 couples the hydraulic fluid in the conduit 52 through a one-way check valve 53 along a bypass branch conduit 54 into the conduit 51 for combining the outflows of the pumps 48 and 49 into a single hydraulic fluid flow.

The combined hydraulic fluid flow in the conduit 51 is coupled to an inlet port 55 of the selector valve 46 which regulates fluid passage to one or both of a pair of fluid supply conduits 56 and 57 coupled to the turbocharger center housing 26. These fluid supply conduits 56 and 57 thus comprise separate fluid flow paths for guiding the hydraulic fluid under pressure through the respective nozzles 28 and 29 into driving communication with the hydraulic turbine 16, in a manner to be described herein in more detail. A generally cylindrical valve member 58 is carried within the selector valve 46 and is biased toward a normal position closing the inlet port 55 by a spring 59 seated within a central chamber 60 of the selector valve and reacting against a fixed shoulder 61, with the spring biasing force being supplemented by the fluid pressure within the oil supply conduit 41 connected to the control chamber 60 via a tube 62.

The hydraulic fluid outflows from the positive displacement pumps 48 and 49 are also coupled to the dual function control valve 45 which responds to operating conditions, such as increasing engine speed and load, to progressively unload the hydraulic fluid from the selector valve 46. This control valve 45, as shown in one exemplary form in FIG. 1, comprises a spool valve having a pair of spool lands 63 and 64 interconnected by a stem 65 of reduced cross-sectional size for movement as a unit within the bore of an elongated hollow valve housing 66. These spool lands 63 and 64 respectively overlie and are adapted to normally close a pair of annular outflow chambers 67 and 68 into which the hydraulic fluid can be unloaded for flow through outlet conduits 69 and 70 to the lower pressure oil supply conduit 41. A small diameter extension arm 71 projects axially from the spool land 63 through a reduced size portion of housing bore with close clearance into a small control chamber 72 and terminates in a control piston 73 closing the chamber 72 at the axial end opposite the spool lands 63 and 64. A biasing spring 74 reacts compressively between a pressure plate 75 and the outboard axial face of the control piston 73 to urge the spool valve toward a normal position with the lands 63 and 64 respectively blocking the outflow chambers 67 and 68, with the biasing force being supplemented by fluid pressure within the oil supply conduit 41 coupled by a tube 76 to act against the outboard face of the pressure plate 75. Conveniently, the magnitude of the spring force applied by the spring 74 can be adjustably set by appropriate rotation of a set screw 78 threaded through the adjacent end of the valve housing 66.

The flow conduit 51 associated with the positive displacement pump 48 is coupled to the control valve 45 for supplying hydraulic fluid into the valve housing at the outboard axial face of the spool land 64, and thus at the end of the spool valve opposite the control piston 73. This fluid is further communicated through a bleed port 80 formed axially through the lands and stem into communication with the outboard face of the other spool land 63 to result in a small net force acting on the spool valve in a direction opposing the spring 74. The hydraulic fluid from the flow conduit 51 is communicated further through a control tube 81 to the mode control switch 47 which, during normal engine running mode conditions, couples this fluid to the control chamber 72 via a tube 82 and further through another tube 83 to one side of a mode selector piston 84 within the selector valve 46, as will be described. The flow conduit 52 associated with the second pump 49 is coupled to the control valve 45 to communicate hydraulic fluid to a position between the spool lands 63 and 64, resulting in balanced axial forces applied thereto.

The mode selector piston 84 within the selector valve 46 responds to the mode setting of the mode control switch 47 to regulate operation of the valve member 58 to control hydraulic fluid supply to the turbocharger center housing 26. More particularly, the selector piston 84 is slidably received within an upper chamber 85 within the selector valve with its upper face responsive to fluid pressure within the pump flow conduit 51 via a small pressure tube 86 and its lower face responsive to the fluid pressure supplied from the mode control switch 47 via the tube 83. A piston rod 87 protrudes downwardly from the selector piston 84 past the fixed shoulder 61 and through the adjacent central chamber 60 toward engagement with an upper axial end of the valve member 58 opposite the inlet port 55.

During engine starting, the mode control switch 47 responds to engine parameters indicative of a starting procedure to close the flow conduit 51 from communication with the control chamber 72 within the control valve 45 and further to close the flow conduit 51 from communication with the lower face of the mode selector piston 84. Instead, the mode control switch 47 couples the control chamber 72 and the lower face of the selector piston 84 to the comparatively much lower fluid pressure within the oil supply conduit 41 via a branch tube 88 coupled to the tube 76, wherein this pressure is relatively low during engine cranking at, for example, an engine rotational speed of typically about 100-200 rpm. While the specific construction of the mode control switch 47 is not shown, a solenoid valve assembly of conventional design is contemplated and is readily rendered responsive to parameters indicative of a starting procedure, such as energization of a starter motor (not shown) or the like. Other alternative switch devices and/or starting parameters will be apparent to those skilled in the art.

Accordingly, during the starting procedure, the fluid pressures acting in opposing directions against the control piston 73 within the control valve 45 are substantially offset and the spring 74 applies a sufficient axial force on the spool valve to prevent fluid unloading through the outflow chambers 67 and 68. In addition, a significant pressure differential occurs across the mode selector piston 84 of the selector valve 46 to urge the piston rod 87 downwardly against the valve body 58 supplementing the forces urging the valve body 58 toward a position closing the inlet port 55. By appropriate selection of the selector valve spring 59, the pressure of the combined flow outputs in the flow conduit 51 is suffficient to partially open the valve body 58 during the starting procedure to permit fluid flow to the turbocharger through the supply conduit 56 but to maintain the second supply conduit 57 closed to fluid flow.

As a result, during engine starting, the hydraulic fluid under pressure is supplied into driving communication with the hydraulic turbine 16 through the nozzle or nozzle set 28 but is prevented from flow through the other nozzle or nozzle set 29. This effectively reduces the available nozzle discharge area through which the hydraulic fluid can flow. Since the magnitude of hydraulic fluid pressure is inversely proportional to the square of the total nozzle area, this effective nozzle area reduction results in a substantial increase in hydraulic pressure and resultant hydraulic driving force imparted to the hydraulic turbine 16. For example, a reduction in available nozzle area by one-half results in an effective quadrupling of hydraulic pressure than otherwise would be available during a starting procedure. The hydraulic turbine 16 is thus more rapidly accelerated and quickly attains a significantly higher rotational speed to substantially increase the mass inflow of charge air to the engine for starting purposes. Hydraulic fluid discharged from the hydraulic turbine is returned through a check valve 90 to the sump 50 via the oil supply conduit 41 in the same manner as described in the above-cited U.S. Pat. Nos. 4,285,200 and 4,444,014.

When the engine 14 starts, the engine accelerates rapidly to a higher speed, typically an idle speed of 700-1000 rpm, and the starter motor is deenergized. When this occurs, the rotating speeds of the pumps 48 and 49 are substantially increased to correspondingly increase their fluid flow outputs and the pressure of those outputs. This higher pressure, however is inadequate to begin pump outflow unloading through the control valve. In addition, starter motor deenergization or other parameters indicative of engine starting return the mode control switch 47 to a normal run mode.

Figure 2:
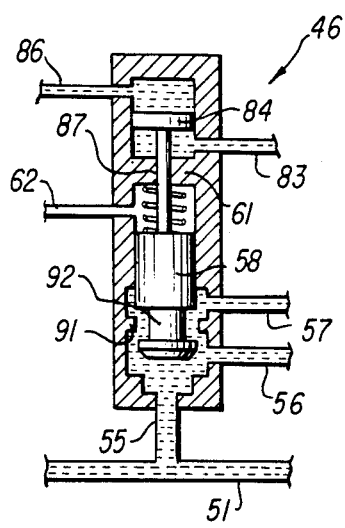
FIG. 2 is an enlarged schematic sectional representation of a selector valve forming a portion of the system, with the selector valve being shown in a normal engine run mode.
Figure 3:
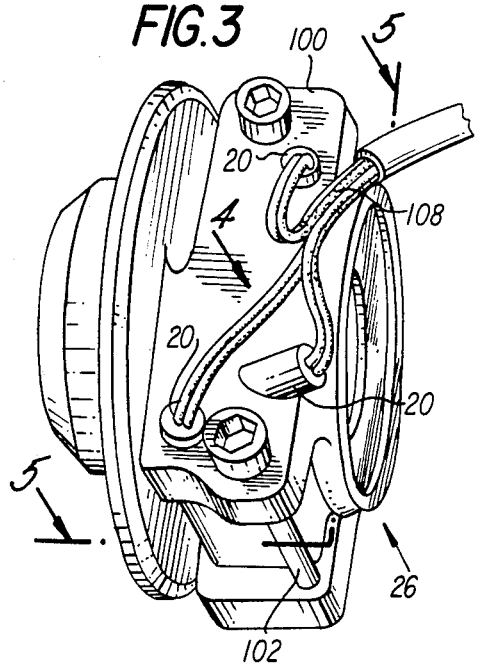
FIG. 3 is a perspective view of a turbocharger center housing for use in the system of the present invention.
Figure 5:
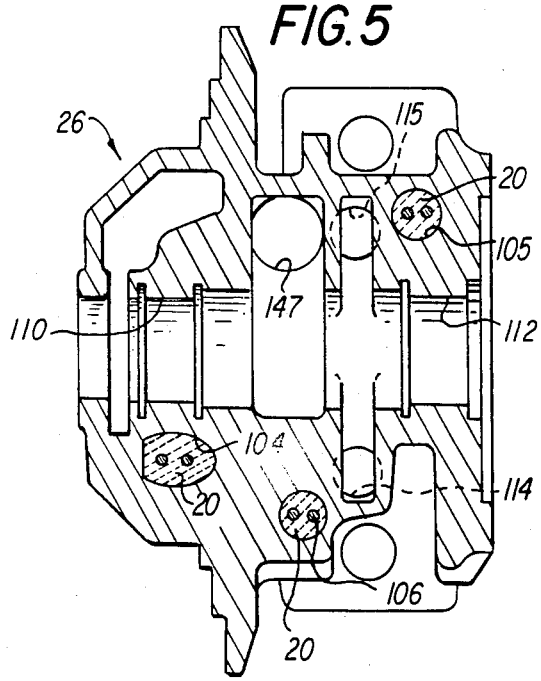
FIG. 5 is an enlarged longitudinal horizontal section through the center housing taken generally on the line 5—5 of FIG. 3.
Figure 4:
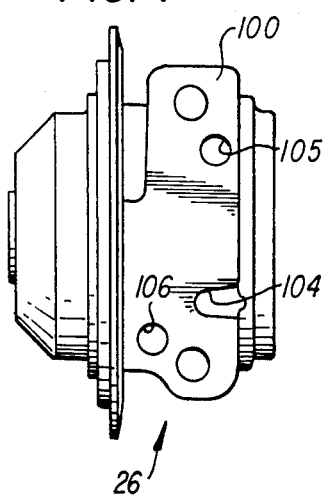
FIG. 4 is top plan view of the center housing generally as viewed along arrow 4 of FIG. 3, and illustrating the mounting positions of a plurality of heating elements.

In the run mode, the mode control switch 47 couples the flow conduit 51 to the control chamber 72 within the control valve 45 to increase the net forces acting on the control piston 73 in opposition to the spring 74. In addition, the switch 47 couples the higher pressure fluid from the flow conduit 51 to the lower face of the mode selector piston 84, thereby nearly counterbalancing the hydraulic force acting upon the upper face of the piston 84, with the net differential area due to the piston rod 83 resulting in minimal supplementation of closure forces applied to the valve body 58. The higher pressure fluid in the conduit 51 and the reduced closure forces on the valve body 58 permit valve body displacement toward a fully open position permitting fluid flow to the turbocharger additionally through the second supply conduit 57 and its associated nozzle or nozzle set 29. The fully open position is shown in FIG. 2, with a cylindrical portion of the valve body 55 displaced upwardly beyond an auxiliary seat 91 to permit fluid flow through a valve body recess 92 to the second supply conduit 57.

During normal run operation of the engine, the fluid pressure in the control chamber 72 of the control valve 45 progressively increases with increasing engine speed from an idle speed condition. This increasing control chamber pressure functions at a predetermined pressure to override the force of the spring 74 and displace the spool lands 63 and 64 initially to open and progressively unload the fluid in the flow conduit 52 and then to unload the fluid in the flow conduit 51, all as described in the above-cited U.S. Pat. No. 4,444,014, to maintain the fluid pressure at the selector valve inlet port 55 substantially constant throughout a range of higher operating speeds. Since the driving energy in the exhaust gases increases with engine speed, the proportion of turbocharger driving attributable to the hydraulic fluid is thus progressively decreased, all in a manner consistent with engine air inflow requirements. When the outflows of the pumps 48 and 49 are fully unloaded at a selected high engine speed, the fluid pressure in the oil supply conduit 41 is increased sufficiently by the substantially increased flow therethrough to provide a supplementing force in the central selector valve chamber 60 assisting the spring 59 in closing the valve member 58. Such valve member closure prevents supplemental driving of the turbocharger and prevents fluid leakage thereto and associated windage losses.

The dual function control valve is also responsive to engine load increases to partially or completely override the above-described speed-responsive unloading operation. More particularly, as shown in FIG. 1, a pneumatically adjusted actuator rod 93 is carried by a movable diaphragm 94 adjacent the outboard end of the control valve spool land 64. The diaphragm 94 is carried within a housing 95 for exposure on one side to an engine load-indicative parameter, such as compressor discharge pressure, via a pneumatic line 96 and on the opposite side to a low-pressure reference fluid as by connection through a tube 97 to the sump return conduit 43.

When engine load increases to a selected maximum level, the diaphragm 94 displaces the actuator rod 93 against the spool land 64 to supplement the forces tending to shift the spool lands 63 and 64 toward further unloading of the pump outflows. Accordingly, when high engine load conditions are reached, the level of supplemental turbocharger driving is further reduced in a manner consistent with actual engine air inflow requirements.

During transient engine operating conditions, the mode control switch 47 can again alter or override the normal run operation of the control and selector valves 45 and 46 by switching back to the same hydraulic connections as described previously with respect to the starting mode. That is, the mode control switch 47 can be rendered responsive to conventional electronic fuel controls and/or scheduling devices or the like to switch state in the presence of a selected transient condition, such as a heavy engine acceleration. When this occurs, the higher fluid pressure in the control chamber 72 is replaced by the lower pressure of the oil supply conduit 41 to permit the control valve spring 74 to return the spool lands 63 and 64 toward positions of decreased or prevented unloading. This applies all or substantially all of the hydraulic fluid at higher pressure to the selector valve inlet port 55 whereat the higher pressure is sufficient to maintain the valve body 58 in a position opening both fluid supply conduits 56 and 57 to the hydraulic turbine 16 throughout the transient condition. Conclusion of the transient condition returns the mode control switch 47 to the normal run state for normal operation as described previously.

As shown best in FIGS. 3–7, facilitated engine starting is further enhanced by the incorporation of the heating elements 20 into a preferred center housing 26. As shown, this center housing 26 includes an upper flange 100 adapted to receive appropriate mounting bolts 102 for mounting the turbocharger onto an engine or engine system at a desired location. This flange 100 is interrupted by a plurality of elongated, open-ended cavities extending into the center housing, with three of said cavities being shown by way of example and referred to by reference numerals 104, 105, and 106. These cavities are sized for relatively close reception of individual heating elements 20, preferably of the electrical resistance type, such as Calrod elements manufactured and sold by the General Electric Company, Schenectady, N.Y. These heating elements are each coupled via appropriate conductors 108 to an electrical power source, such as a vehicle battery for operation when desired by closure of a conventional switch (not shown).

Figure 7:
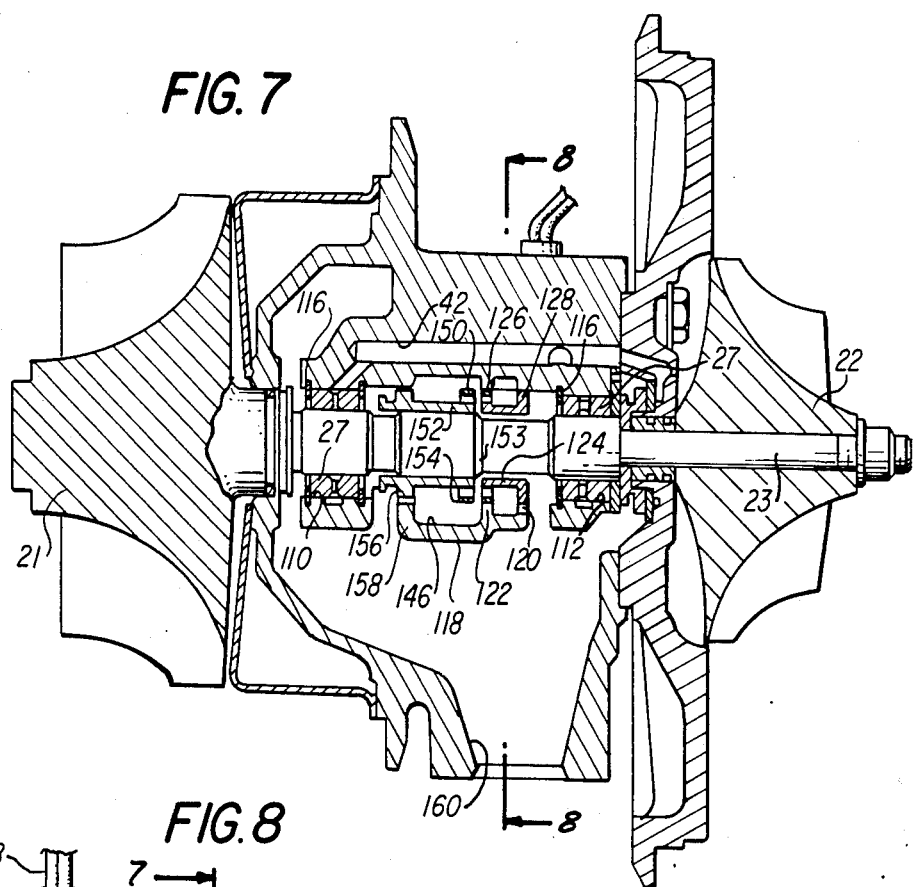
FIG. 7 is an enlarged longitudinal vertical section through the turbocharger center housing with a turbocharger rotating assembly supported therein and with turbine and compressor housings removed for clarity.

In the illustrative embodiment of the invention, the three heating elements are installed within the center housing 26 for supplying heat energy to selected regions thereof prior to a starting procedure. In particular, the heating elements seated within the cavities 104 and 105 are positioned respectively to heat the center housing in the vicinities of the turbine and compressor end bearing bores 110 and 112 (FIG. 5) and thus also to heat the turbine and compressor end journal bearings 27 (FIGS. 1 and 7). In addition, the remaining heating element received within the cavity 106 is positioned adjacent and warms the center housing in the vicinity of an inflow passage 114 associated with the supply conduit 56 through which hydraulic fluid is coupled during a starting procedure.

During cold weather conditions, the heating elements 20 can be energized for a few minutes prior to an engine starting procedure to input heat energy to the center housing 26. The center housing 26 and the bearings 27 act as a heat sink to store the thermal energy for immediate heating of hydraulic fluid supplied through the oil supply conduit 41 and related passages 42 to lubricate the bearings as well as immediate heating of the hydraulic fluid supplied through the inflow passage 114 for driving the hydraulic turbine 16. These fluids are thus significantly decreased in viscosity for substantially immediate break-out or initiation of turbocharger rotation without traditional bearing sticking or drag associated with cold oil. Moreover, the higher-viscosity fluid permits a more rapid turbocharger acceleration to a significantly higher rotational speed to supply sufficient charge air mass flow to the engine for starting purposes.

In accordance with further aspects of the invention, the turbocharger center housing 26 is adapted for convenient and simplified assembly with the hydraulic turbine 16 positioned closely adjacent the nozzles 28 and 29. More particularly, the center housing is formed with a central bore for receiving the shaft 23, wherein the bore is defined by the axially spaced bearing bores 110 and 112 within which conventional journal bearings are retained by retainer rings 116, as viewed in FIG. 7. An hydraulic fluid flow boss 118 is formed axially between the bearing bores 110 and 112 to include a central shaft bore sized diametrically larger than the bearing bores. A pair of walls 120 and 122 project radially inwardly a short distance near one axial end of the boss 118 and terminate on a diameter for close press-fit reception of a nozzle sleeve 124 having an internal diameter for running clearance with the shaft 23 and including radially outwardly projecting walls 126 and 128 for seating with the boss walls 120 and 122. A pair of axially extending dividers 130 and 132 also project outwardly from the nozzle sleeve 124 for press-fit engagement with similar axial dividers 134 and 136 projecting inwardly from the boss 118, whereby the boss 118 and nozzle sleeve 124 cooperate to define a pair of axially split, semicylindrical inflow chambers 138 and 140 (FIG. 8) for receiving hydraulic fluid respectively through the inflow passage 114 associated with the supply conduit 56 and a separate inflow passage 115 associated with the other supply conduit 57.

Figure 8:
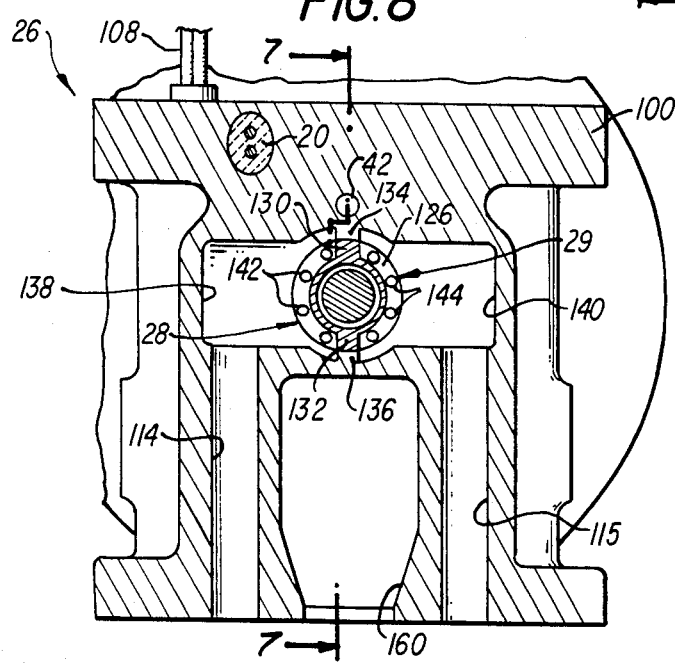
FIG. 8 is a fragmented transverse vertical section taken generally on the line 8—8 of FIG. 7.
Figure 6:
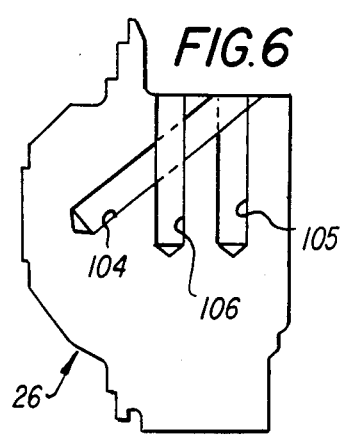
FIG. 6 is a schematic front elevational outline view of the center housing illustrating the relative positions of bores for reception of the heating elements.

The upstanding wall 126 of the nozzle sleeve 124 includes two sets of axially open, circumferentially angled nozzle openings 142 and 144 respectively defining the two nozzles 28 and 29. While each nozzle set is shown in FIG. 8 to have four nozzle openings, the specific numbers can be varied as desired. These nozzle openings are oriented to discharge hydraulic fluid from their associated inflow chambers 138 and 140 into driving communication with the hydraulic turbine 16 within an adjacent outflow chamber 146.

The hydraulic turbine 16 is formed by a radially upstanding wall 150 at open end of a turbine sleeve 152 sized for press-fit reception onto and rotation with the turbocharger shaft 23. The turbine 16 is of the nonventilating type with arcuate blades 153 and an enclosing outer shroud 154. An upstanding outboard end wall 156 near the other end of the turbine sleeve 152 is sized for close running clearance with an axially aligned inwardly projecting wall 158 on the boss 118 to substantially enclose the turbine outflow chamber 146, with a lower drain 147 (FIG. 5) being sufficiently small in size for substantially immediate flooding and nonventilated turbine operation when hydraulic fluid is supplied via one or both of the nozzles 28 and 29. When hydraulic fluid inflow is halted, the end wall 156 of the turbine sleeve 152 acts as a slinger to rapidly lower the fluid level in the chamber 146 sufficient to prevent fluid foaming. The fluid discharged from the chamber 146 through the drain 147 is coupled to the oil supply conduit 41 (FIG. 1), whereas the bearing lubricant drains through a sump 160 (FIG. 7) for return to the engine sump 36 (FIG. 1) via the sump return conduit 43.

The improved hydraulic assist turbocharger system 10 of the present invention thus insures facilitated engine starting even during cold weather conditions by increasing the pressure and/or decreasing the viscosity of the hydraulic fluid supplied to the hydraulic turbine 16 and to lubricate the turbocharger bearings 27, resulting in higher turbocharger rotational speed for increased engine air inflow and faster engine starting. During normal engine running, however, the system provides the required level of supplemental turbocharger driving to maintain a required engine air flow, while further being adapted to accommodate transient conditions, such as rapid accelerations. In addition, the preferred center housing 26 for the turbocharger is designed for simplified assembly consistent with high production requirements and reliable use, and further consistent with the multiple separate nozzles 28 and 29 and the heating elements 20 for controlling fluid pressure and viscosity in the starting mode.

An alternative form of the hydraulic assist turbocharger system is shown in FIG. 9 wherein the system is further adapted for close scheduling of engine air-fuel ratio to a selected and typically variable absolute ratio according to the particular combination of engine operating conditions, such as speed and load. Such air-fuel ratio control advantageously permits accurate and optimal adjustment of the ratio by controlling air flow and fuel flow simultaneously for achieving the best overall engine operation, including efficiency and emissions level, for the particular set of operating conditions.

In the embodiment of FIG. 9, wherein components corresponding to or analogous with those shown in FIG. 1 are referred to by common primed reference numerals, a combustion engine 14' is supplied with charge air by a three-wheel turbocharger 12' including an exhaust gas-driven turbine wheel 21', a compressor wheel 22' an an hydraulic turbine 16' carried within a turbocharger center housing 26' on a shaft 23'. A flow control system 18' including a control valve 45' and a selector valve 46' are coupled between the turbocharger and an hydrualic pumping system 35' forming a part of an engine lubrication system.

When supplemental turbocharger driving is required, a high pressure pump assembly 44' including at least two engine-driven pumps 48' and 49' supply hydraulic fluid outflow via respective conduits 51' and 52' to an inlet port 55' of the selector valve 46' and to the control valve 45', with a one-way check valve 53' being provided to permit combining of the outflows into the conduit 51'. Within the control valve 45', a simplified spool valve includes a pair of spool lands 63' and 64' slidably carried within an elongated valve housing 66', with a reduced diameter stem 65' coupled between said lands. A control spring 74' reacts against an adjustable pressure plate 75' at one end of the control valve an an outboard axial face of the spool land 63' to urge the lands 63' and 64' toward normal positions respectively closing fluid entry into annular outflow chambers 67' and 68' connected in turn to a relatively low-pressure oil supply conduit 41'. The low pressure within this conduit 41' is conveniently coupled through a tube 76' into the control valve to supplement the force of the spring 74'.

The fluid conduit 51' is coupled to the control valve 45' for fluid flow into a control chamber 72' adjacent the outboard axial face of the spool land 64' to apply a net force on the valve spool acting in opposition to the control spring 74'. The other fluid conduit 52' is coupled into the control valve at a position between the spool lands 63' and 64' and thus does not provide a net axial force on the valve spool. Accordingly, the fluid pressure in the control chamber 72' acts against the spring 74' to displace the spool lands 63' and 64' progressively toward positions unloading the hydraulic fluid outflows in accordance with engine air inflow requirements, in the same general manner as described with respect to the embodiment of FIG. 1.

Prior to an engine starting procedure, the turbocharger center housing 26' can be preheated by a plurality of heating elements 20' installed in the center housing in the manner as described with respect to the previous embodiment. These heating elements thus reduce the viscosity of hydraulic fluid supplied during subsequent engine cranking for starting purposes to insure substantially immediate turbocharger rotation without bearing sticking and rapid rotation to a high speed capable of supplying the engine with sufficient charge air for starting purposes.

Upon initiation of engine cranking to start the engine, a mode control switch 47' such as a solenoid valve assembly responsive, for example, to energization of a starter motor (not shown) couples fluid under pressure generated by the pumps 48' and 49' via tubes 81' and 83' to an upper face of a mode selector piston 84' within an upper chamber 85' of the selector valve. The lower face of this selector piston 84' communicates with the lower pressure oil supply line 41' via a pressure tube 86', whereby the selector piston 84' applies a net downward force, as viewed in FIG. 9, through a piston rod 87' on a valve member 58'. This valve member 58' is also urged downwardly by a spring 59' an the oil supply line pressure within a central chamber 60' toward a normal position closing the selector valve inlet port 55'. The hydraulic pressure in the flow conduit 51', however, partially overcomes the downward net forces during engine cranking to partially open the valve member 58', resulting in fluid flow at substantial pressure through one supply conduit 56' and through one nozzle or nozzle set 28' into driving communication with the hydraulic turbine 16'. A second fluid supply conduit 57' remains closed to fluid entry to prevent flow to a second nozzle or nozzle set 29', thereby effectively increasing hydraulic pressure without increasing pump capacity for increased turbocharger driving and increased engine air flow during starting.

As soon as the engine starts, the mode control switch 47' in FIG. 9 switches state by response, for example, to starter motor deenergization or the like. More particularly, the switch 47' couples the upper face of the mode selector piston 84' to the oil supply conduit 41' to remove a substantial component of downward biasing force on the valve member 58'. At the same time, the engine accelerates to a significantly higher speed to increase the hydraulic pressure at the selector valve inlet port 55'. These factors combine to cause the valve member 58' to fully open and permit hydraulic fluid flow through both supply conduits 56' and 57' to the hydraulic turbine 16'.

With the engine started, the control valve 45' progressively unloads the hydrauilc flow outputs of the pumps 48' and 49' to maintain the pressure within the control chamber 72' substantially constant when that pressure reaches a predetermined limit, as described generally with respect to the embodiment of FIG. 1. The system shown in FIG. 9, however, includes electronic means for overriding normal pressure-responsive operation of the control valve 45' to obtain close air-fuel ratio scheduling throughout any desired range of conditions.

More particularly, the system depicted in FIG. 9 includes a master control unit 200 preferably in the form of a programmable electronic control module of the type known for scheduling fuel flow in combustion engines or the like. The illustrative master control unit 200 receives a plurality of inputs indicative of engine operating conditions, with a speed detector 202, such as a tachometer or the like, and a load detector 204, such as a pressure sensor for detecting compressor discharge pressure, being shown by way of a nonlimited example. The master control unit 200 responds to engine operating parameter inputs to determine the combination of air flow and fuel flow required in accordance with an optimum air-fuel ratio schedule wherein the absolute air-fuel ratio typically varies throughout a range of operating conditions. This control is achieved by an appropriate command signal represented by arrow 206 coupled to a conventional fuel flow regulator 208 which controls fuel flow from a supply to the engine. In addition, the master control unit 200 provides a command signal along conductors 209 to a pilot controller 210.

The pilot controller 210 in the illustrative embodiment comprises an electrohydraulic device responsive to the command signal in the form of a proportional dc voltage. More particularly, the command signal is connected to a winding 212 within the pilot controller for displacing a spring-loaded armature 214 to controllably position a control arm 216 movable within a cylinder 218. The control arm 216 includes an axially spaced piston 220 and poppet 222 at the end of the cylinder 218, with a pilot fluid at predetermined pressure coupled into the cylinder between the piston 220 and poppet 222. The pilot fluid is obtained from the discharge side of a pressure regulator 224 to which a small flow of hydraulic fluid is supplied, for example, through a conduit 226 collecting a bearing leakage flow from the pumps 48' and 49'. Excess fluid supplied to the regulator 224 is recycled to the oil supply conduit 41' or other convenient low-pressure site.

The pilot controller 210 responds to the voltage of the command signal to modulate the position of the poppet 222 relative to the end of the cylinder 218 and an adjacent outlet port 228 coupled to a pilot pressure conduit 230. The poppet position is thus controlled to provide fluid to the pilot pressure conduit 230 at a pressure representative of combined operating parameters, such as engine speed and load. This pilot pressure conduit is connected in turn to one side of a control piston 232 within an enlarged housing 234 at one end of the control valve 45', with the other side of the control piston 232 being coupled to a lower reference pressure, such as by connection to the oil supply conduit 41'. A bypass orifice 235 is also provided to permit bleed flow from the pilot pressure conuit 230 into the oil supply conduit 41'.

The control piston 232 carries an actuator rod 236 for engagement with the outboard face of the control valve spool land 64' within the control chamber 72'. When such engagement occurs, the control piston 232 overrides control valve operation to increase pump outflow unloading in accordance with combined speed and load or other parmeters, simultaneously with control of engine fuel flow in response to the same parameters. Alternatively, if desired, the actuator rod 236 can be connected directly to the spool land 64' to shift the spool lands 63' and 64' back and forth under the control of the master control unit 200. In this latter case, the actuator ro 236 can draw the spool lands toward positions of decreased unloading throughout a transient condition requiring engine acceleration, as detected by the master control unit.

The imporved hydraulic assist turbocharger system as described herein thus provides a practical and effective means for facilitating engine starting in a system including a three-wheel turbocharger, while maintaining overall control of supplemental turbocharger driving throughout a range of normal and/or transient operating conditions. Moreover, the system is adapted for concurrent air flow and fuel flow control using a single control unit device responsive to a set of engine operating parameters to optimize engine efficiency and to minimize toxic emissions.

A variety of modifications and improvements to the system described herein are believed to be apparent to those skilled in the art. Accordingly, no limitation on the invention is intended by way of the descriptions herein, accept as set forth in the appended claims.

What is claimed is:

1. An hydraulic assist turbocharger system for supplying charge air to a combustion engine, comprising:

an hydraulic assist turbocharger having a first turbine driven by engine exhaust gases, a compressor rotatably driven by said first turbine for supplying charge air to the engine, and an hydraulic turbine for selective supplemental driving of said compressor;

hydraulic fluid supply means for selectively supplying an hydraulic fluid under pressure into rotatable driving communicating with said hydraulic turbine, said fluid supply means including at least two nozzles for passage of the fluid under pressure into driving communication with said hydraulic turbine;

means for selectively preventing passage of the fluid under pressure through at least one of said nozzles and for permitting passage of the fluid under pressure through at least one other of said nozzles during an engine starting procedure to decrease the available nozzle flow area open to fluid passage and thereby increase the pressure of hydraulic fluid during the engine starting procedure to correspondingly increase supplemental driving of said compressor resulting in increased supply of charge air to the engine; and means for selectively decreasing the viscosity of the hydraulic fluid during a starting procedure of increase the flow rate of the hydraulic fluid into driving communication with said hydraulic turbine during the starting procedure to correspondingly increase supplemental driving of said compressor resulting in increased supply of charge air to the engine.

2. The hydraulic assist turbocharger system of claim 1 wherein the engine includes an hydraulic lubrication system having a source of the hydraulic fluid and including means for lubricating said turbocharger, said hydraulic fluid supply means being coupled generally between said hydraulic lubrication system and said turbocharger.

3. The hydraulic assist turbocharger system of claim 2 wherein said viscosity decreasing means comprises means for heating the hydraulic fluid under pressure flowing into driving communication with said hydraulic turbine and for heating hydraulic fluid supplied to said turbocharger for lubrication.

4. The hydraulic assist turbocharger system of claim 1 wherein said turbocharger includes means for substantially fully submerging said hydraulic turbine for substantially nonventilated operation thereof when the fluid under pressure is supplied into driving communication therewith.

5. The hydraulic assist turbocharger system of claim 1 wherein said hydraulic fluid supply means includes at least two supply conduits for separate passage of the hydraulic fluid under pressure to said at least two nozzles, said means for selectively preventing and permitting fluid passage being for preventing fluid passage through at least one of said supply conduits and permitting fluid passage through at least one other of said supply conduits during a starting procedure.

6. The hydraulic assist turbocharger system of claim 5 wherein said fluid supply means includes two of said supply conduits and two of said nozzles in separate flow communication with the fluid under pressure via said two supply conduits.

7. The hydraulic assist turbocharger system of claim 5 wherein each of said nozzles comprises means forming a plurality of relatively small nozzle openings for passage of hydraulic fluid into driving communication with said hydraulic turbine.

8. The hydraulic assist turbocharger system of claim 1, wherein said hydraulic fluid supply means comprises pump means for providing the hydraulic fluid under pressure for flow through said nozzles into driving communication with said hydraulic turbine, and control means including means for responding to engine speed and means for responding to engine load for coupling the hydraulic fluid under pressure to the hydraulic turbine during one condition of engine operation for maximum supplemental driving of said compressor, and for progressively uncoupling the hydraulic fluid under pressure from the hydraulic turbine in response to changes in at least one of engine speed and load for reduced supplemental driving of said compressor.

9. The hydraulic assist turbocharger system of claim 8 wherein said pump mean comprises a plurality of pumps for providing a plurality of hydraulic fluid outflows for coupling to said hydraulic turbine during said one condition of engine operation, said control means serially and progressively unloading said pump outflows one at a time from said hydraulic turbine in response to said changes in at least one of engine speed and load.

10. The hydraulic assist turbocharger system of claim 9 wherein said plurality of pumps comprises a plurality of engine-driven positive displacement pumps.

11. The hydraulic assist turbocharger system of claim 9 including means for combining said plurality of hydraulic fluid outflows for supply as a single hydraulic fluid flow to said hydraulic turbine.

12. The hydraulic assist turbocharger system of claim 8 including means for positively preventing hydraulic fluid flow to said hydraulic turbine during a second condition of engine operation.

13. The hydraulic assist turbocharger system of claim 8 wherein said control means comprises a control valve having said plurality of hydraulic fluid outflows coupled thereto, a selector valve having said plurality of hydraulic fluid outflows coupled thereto, and a mode control switch;

said control valve including said engine speed responsive means and said engine load responsive means for preventing uncoupling of said hydraulic fluid outflows when the pressure thereof is below a predetermined level and for variably uncoupling said hydraulic fluid outflows when the pressure is above said predetermined level, said selector valve including a valve member for controlling passage of said hydraulic fluid outflows to at least two supply conduits coupled separately to said at least two nozzles and means for positioning said valve member during engine run conditions to permit passage of the hydraulic fluid outflows to said at least two supply conduits, and said mode control switch including means for repositioning said valve member during an engine starting procedure to prevent passage of the hydraulic fluid outflows to at least one of said supply conduits and to permit passage of the hydraulic fluid outflows to at least one other of said supply conduits.

14. The hydraulic assist turbocharger system of claim 13 wherein said valve member is movably positioned to open and close a selector valve inlet port to control passage of the hydraulic fluid outflows to said supply conduits, said valve member positioning means applying a first biasing force to said valve member urging said valve member toward a position closing said inlet port, said mode control switch responding to initiation of an engine starting procedure for applying a supplemental biasing force urging said valve member toward a position closing said inlet port.

15. The hydraulic assist turbocharger system of claim 14 wherein said selector valve further includes a mode selector piston carrying a piston rod for engaging said valve member for applying said supplemental biasing force thereto, said mode control switch responding to an engine starting procedure to apply a fluid bias pressure to said mode selector position to urge said piston toward said valve member, said mode control switch responding to engine starting to relieve said fluid bias pressure from said mode selector piston.

16. The hydraulic assist turbocharger system of claim 15 wherein the fluid bias pressure applied by said mode control switch to said mode selector piston during an engine starting procedure comprises the pressure of the hydraulic fluid outflows from said pumps.

17. The hydraulic assist turbocharger system of claim 1 wherein said turbocharger includes a center housing, a shaft interconnecting said turbine and compressor and extending through said center housing, and shaft bearing means rotatably supporting said shaft within said center housing, said hydraulic turbine being supported on said shaft for rotation therewith within said center housing, said center housing defining at least two flow passages for separate passage of the hydraulic fluid to said at least two nozzles.

18. The hydraulic assist turbocharger system of claim 17 wherein said means for selectively preventing and permitting fluid passage to said nozzles comprises means for preventing fluid passage through at least one of said center housing flow passages and for permitting fluid passage through at least one other of said center housing flow passages during an engine starting procedure, said viscosity decreasing means including means for heating said center housing in the vicinity of said at least one other of said center housing passages.

19. The hydraulic assist turbocharger system of claim 18 wherein said viscosity decreasing means further includes means for heating said center housing in the vicinity of said bearing means.

20. The hydraulic assist turbocharger system of claim 1 further including an engine fuel flow regulator for regulating fuel inflow to the engine, means for sensing at least one engine operating condition and for generating at least one parameter signal representative of said operating condition, and master control means for receiving said at least one parameter signal and being responsive thereto for simultaneously controlling said fuel flow regulator to control engine fuel inflow and for controlling said hydraulic fluid supply means to control the level of supplemental driving said compressor thereby also controlling engine air inflow.

21. An hydraulic assist turbocharger system for supplying charge air to a combustion engine, comprising:
an hydraulic assist turbocharger having a first turbine driven by engine exhaust gases, a compressor rotatably driven by said first turbine for supplying charge air to the engine, and an hydraulic turbine for selective supplemental driving of said compressor;
hydraulic fluid supply means for selectively supplying hydraulic fluid under pressure into rotatable driving communication with said hydraulic turbine, said fluid supply means including variable area nozzle means for passage of the hydraulic fluid under pressure into driving communication with said hydraulic turbine;
means for increasing the pressure of the hydraulic fluid supplied to said hydraulic turbine during an engine starting procedure to correspondingly increase supplemental driving of said compressor resulting in increased supply of charge air to the engine, said pressure increasing means including means for decreasing the available nozzle flow area of said nozzle means during an engine starting procedure to increase the pressure of the hydraulic fluid supplied into driving communication with said hydraulic turbine; and
means for selectively decreasing the viscosity of the hydraulic fluid during a starting procedure to increase the flow rate of the hydraulic fluid into driving communication with said hydraulic turbine during the starting procedure to correspondingly increase supplemental driving of said compressor resulting in increased supply of charge air to the engine.

22. The hydraulic assist turbocharger system of claim 21 wherein said hydraulic fluid supply means includes at least one engine driven pump for providing the supply of hydraulic fluid under pressure.

23. The hydraulic assist turbocharger system of claim 21 wherein said turbocharger includes means for substantially fully submerging said hydraulic turbine for substantially nonventilated operation thereof when the fluid under pressure is supplied into driving communication therewith.

24. An hydraulic assist turbocharger system for supplying charge air to a combustion engine, comprising:
an hydraulic assist turbocharger having a first turbine driven by engine exhaust gases, a compressor rotatably driven by said first turbine for supplying charge air to the engine, and an hydraulic turbine for selective supplemental driving of said compressor;
hydraulic fluid supply means for selectively supplying hydraulic fluid under pressure into rotatable driving communication with said hydraulic turbine, said hydraulic fluid supply means including at least two nozzles and at least two supply conduits for flow of the hydraulic fluid under pressure separately through said nozzles into driving communication with said hydraulic turbine;
means for increasing the pressure of the hydraulic fluid supplied to said hydraulic turbine during an engine starting procedure to correspondingly increase supplemental driving of said compressor resulting in increased supply of charge air to the engine, said pressure increasing means including means for preventing fluid passage through at least one of said supply conduits and permitting fluid passage through at least one other of said supply conduits during a starting procedure; and
means for selectively decreasing the viscosity of the hydraulic fluid during a starting procedure to increase the flow rate of the hydraulic fluid into driving communication with said hydraulic turbine during the starting procedure to correspondingly increase supplemental driving of said compressor resulting in increased supply of charge air to the engine.

25. The hydraulic assist turbocharger system of claim 24 wherein said turbocharger includes a center housing, a shaft interconnecting said turbine and compressor and extending through said center housing, and shaft bearing means rotatably supporting said shaft within said center housing, said hydraulic turbine being supported on said shaft for rotation therewith within said center housing, said center housing defining at least two flow passages for separate passage of the hydraulic fluid to said at least two nozzles.

26. The hydraulic assist turbocharger system of claim 25 wherein said means for selectively preventing and permitting fluid passage to said nozzles comprises means for preventing fluid passage through at least one of said center housing flow passages and for permitting fluid passage through at least one other of said center housing flow passages during an engine starting procedure, said viscosity decreasing means including means for heating said center housing in the vicinity of said at least one other of said center housing passages.

27. The hydraulic assist turbocharger system of claim 26 wherein said viscosity decreasing means further includes means for heating said center housing in the vicinity of said bearing means.

28. The hydraulic assist turbocharger system of claim 27 further including an engine fuel flow regulator for regulating fuel inflow to the engine, means for sensing at least one engine operating condition and for generating at least one parameter signal representative of said operating condition, and master control means for receiving said at least one parameter signal and being responsive thereto for simultaneously controlling said fuel flow regulator to control engine fuel inflow and for controlling said hydraulic fluid supply means to control the level of supplemental driving said said compressor thereby also controlling engine air inflow.

29. An hydraulic assist turbocharger system for supplying charge air to a combustion engine, comprising:
an hydraulic assist turbocharger having a first turbine driven by engine exhaust gases, a compressor rotatably driven by said first turbine for supplying charge air to the engine, and an hydraulic turbine for selective supplemental driving of said compressor;
hydraulic fluid supply means for selectively supplying hydraulic fluid under pressure into rotatable driving communication with said hydraulic turbine, said hydraulic fluid supply means including variable area nozzle means for passage of the hydraulic fluid under pressure into driving communication with said hydraulic turbine; and means for increasing the pressure of the hydraulic fluid supplied to said hydraulic turbine during an engine starting procedure to correspondingly increase supplemental driving of said compressor resulting in increased supply of charge air to the engine, said pressure increasing means including means for decreasing the available nozzle flow area of said nozzle means during an engine starting procedure to increase the pressure of the hydraulic fluid supplied into driving communication with said hydraulic turbine.

30. The hydraulic assist turbocharger system of claim 29 wherein said turbocharger includes means for substantially fully submerging said hydraulic turbine for substantially nonventilated operation thereof when the fluid under pressure is supplied into driving communication therewith.

31. An hydraulic assist turbocharger system for supplying charge air to a combustion engine, comprising:

an hydraulic assist turbocharger having a first turbine driven by engine exhaust gases, a compressor rotatably driven by said first turbine for supplying charge air to the engine, and an hydraulic turbine for selective supplemental driving of said compressor;

hydraulic fluid supply means for selectively supplying hydraulic fluid under pressure into rotatable driving communication with said hydraulic turbine, said hydraulic fluid supply means including at least two nozzles and at least two supply conduits for flow of the hydraulic fluid under pressure separately through said nozzles into driving communication with said hydraulic turbine; and means for increasing the pressure of the hydraulic turbine during an engine starting procedure to correspondingly increase supplemental driving of said compressor resulting in increased supply of charge air to the engine, said pressure increasing means including means for preventing fluid passage through at least one of said supply conduits and permitting fluid passage through at least one other of said supply conduits during a starting procedure.

32. The hydraulic assist turbocharger system of claim 31 wherein said turbocharger includes a center housing, a shaft interconnecting said turbine and compressor and extending through said center housing, and shaft bearing means rotatably supporting said shaft within said center housing, said hydraulic turbine being supported on said shaft for rotation therewith within said center housing, said center housing defining at least two flow passages for separate passage of the hydraulic fluid to said at least two nozzles.

33. The hydraulic assist turbocharger system of claim 32 wherein said means for selectively preventing and permitting fluid passage to said nozzles comprises means for preventing fluid passage through at least one of said center housing flow passages and for permitting fluid passage through at least one other of said center housing flow passages during an engine starting procedure and further including means for heating said center housing in the vicinity of said at least one other of said center housing passages.

34. The hydraulic assist turbocharger system of claim 33 further including means for heating said center housing in the vicinity of said bearing means.

35. The hydraulic assist turbocharger system of claim 29 further including an engine fuel flow regulator for regulating fuel inflow to the engine, means for sensing at least one engine operating condition and for generating at least one parameter signal representative of said operating condition, and master control means for receiving said at least one parameter signal and being responsive thereto for simultaneously controlling said fuel flow regulator to control engine fuel inflow and for controlling said hydraulic fluid supply means to control the level of supplemental driving said said compressor thereby also controlling engine air inflow.

36. An hydraulic assist turbocharger system for supplying charge air to a combustion engine, comprising:

an hydraulic assist turbocharger having a first turbine driven by engine exhaust gases, a compressor, a shaft interconnecting said first turbine and said compressor, a center housing, shaft bearing means for rotatably supporting said shaft within said center housing whereby said first turbine rotatably drives said compressor for supplying charge air to the engine, and an hydraulic turbine on said shaft for selective supplemental driving of said compressor;

hydraulic fluid supply means for selectively supplying hydraulic fluid under pressure into rotatable driving communication with said hydraulic turbine; and heating means disposed on said center housing for increasing the temperature of at least selected portions of said center housing to decrease the viscosity of the hydraulic fluid supplied into driving communication with said hydraulic turbine during a selected engine starting procedure to increase the flow rate of the hydraulic fluid into driving communication with said hydraulic turbine during the starting procedure to correspondingly increase supplemental driving of said compressor resulting in increased supply of charge air to the engine.

37. The hydraulic assist turbocharger of claim 36 wherein said center housing includes at least one flow passage for passage of the hydraulic fluid into driving communication with said hydraulic turbine, said heating means including a heating element for directly increasing the temperature of said center housing in the vicinity of said at least one flow passage.

38. The hydraulic assist turbocharger system of claim 36 including means for supplying a portion of the hydraulic fluid to lubricate said shaft bearing means, said heating means further including a heating element for directly increasing the temperature of said center housing in the vicinity of said shaft bearing means.

39. the hydraulic assist turbocharger system of claim 36 further including means for increasing the pressure of the hydraulic fluid supplied to said hydraulic turbine during an engine starting procedure to correspondingly increase supplemental driving of said compressor resulting in increased supply of charge air to the engine.

40. The hydraulic assist turbocharger system of claim 36 wherein said turbocharger includes means for substantially fully submerging said hydraulic turbine for substantially nonventilated operation thereof when the fluid under pressure is supplied into driving communication therewith.

41. The hydraulic assist turbocharger system of claim 36 further including an engine fuel flow regulator for regulating fuel inflow to the engine, means for sensing at least one engine operating condition and for generating at least one parameter signal representative of said operating condition, and master control means for receiving said at least one parameter signal and being responsive thereto for simultaneously controlling said fuel flow regulator to control engine fuel inflow and for controlling said hydraulic fluid supply means to control the level of supplemental driving said said compressor thereby also controlling engine air inflow.

42. An hydraulic assist turbocharger system for supplying charge air to a combustion engine, comprising:
an hydraulic assist turbocharger having a first turbine driven by engine exhaust gases, a compressor, a shaft interconnecting said first turbine and said compressor, a center housing, shaft bearing means for rotatably supporting said shaft within said center housing whereby said first turbine rotatably drives said compressor for supplying charge air to the engine, and an hydraulic tubrine on said shaft for selective supplemental driving of said compressor;
hydraulic fluid supply means for selectively supplying hydraulic fluid under pressure into rotatable driving communication with said hydraulic turbine, said hydraulic fluid supply means including at least one engine driven pump for providing the supply of hydraulic fluid under pressure and further including variable area nozzle means for passage of the hydraulic fluid under pressure into driving communication with said hydraulic turbine;
heating means for increasing the temperature of at least selected portions of said center housing to decrease the viscosity of the hydraulic fluid supplied into driving communication with said hydraulic turbine during a selected engine starting procedure to increase the flow rate of the hydraulic fluid into driving communication with said hydraulic turbine during the starting procedure to correspondingly increase supplemental driving of said compressor resulting in increased supply of charge air to the engine; and
means for increasing the pressure of the hydraulic fluid supplied to said hydraulic turbine during an engine starting procedure to correspondingly increase supplemental driving of said compressor resulting in increased supply of charge air to the engine, said pressure increasing means including means for decreasing the available nozzle flow area of said nozzle means during an engine starting procedure to increase the pressure of the hydraulic fluid supplied into driving communication with said hydraulic turbine.

43. An hydraulic assist turbocharger system for supplying charge air to a combustion engine, comprising:
an hydraulic assist turbocharger having a first turbine driven by engine exhaust gases, a compressor, a shaft interconnecting said first turbine and said compressor, a center housing, shaft bearing means for rotatably supporting said shaft within said center housing whereby said first turbine rotatably drives said compressor for supplying charge air to the engine, and nonventilated hydraulic turbine means associated with said shaft within said center housing for supplementally driving said compressor;
pump means driven by the engine for supplying at least one hydraulic fluid outflow;
a control valve having said hydraulic fluid outflow coupled thereto and including means for regulating the pressure of said outflow;
a selector valve having said hydraulic fluid outflow coupled thereto;
at least two nozzles on said center housing for passage of hydraulic fluid under pressure into rotatable driving communication with said hydraulic turbine means;
at least two fluid supply conduits coupled between said selector valve and said at least two nozzles for separate supply of hydraulic fluid to said nozzles;
a valve member within said selector valve movable to a first postion preventing flow of the hydraulic fluid outflow to at least one of said supply conduits and permitting flow of the hydraulic fluid outflow to at least one other of said supply conduits, and a second position permitting flow of the hydraulic fluid outflow to said least two supply conduits; and
means for controllably positioning said valve member in said first position during an engine starting procedure to decrease the available nozzle flow area open to fluid passage and thereby increase the pressure of the hydraulic fluid outflow supplied to said hydraulic turbine means for increased supplemental driving of said compressor during the engine starting procedure, and for positioning said valve member in said second position when the engine is running.

44. The hydraulic assist turbocharger system of claim 43 further including means for selectively decreasing the viscosity of the hydraulic fluid during a starting procedure to increase the flow rate of the hydraulic fluid into driving communication with said hydraulic turbine means during the starting procedure to correspondingly increase supplemental driving of said compressor resulting in increased supply of charge air to the engine.

45. The hydraulic assist turbocharger system of claim 43 wherein the engine includes an hydraulic lubrication system including means for lubricating said turbocharger shaft bearing means, said viscosity decreasing means including means for heating said center housing in the vicinity of said shaft bearing means prior to a selected engine starting procedure.

46. The hydraulic assist turbocharger system of claim 45 wherein said viscosity decreasing means comprises a plurality of electrical resistance heating elements mounted on said center housing.

47. The hydraulic assist turbocharger system of claim 46 wherein said heating elements are seated within cavities formed in said center housing.

48. The hydraulic assist turbocharger system of claim 43 wherein said pump means comprises a plurality of pumps for providing a combined hydraulic fluid outflow, said control valve including means for variably unloading said outflow from said selector valve in response to changes in engine operating conditions.

49. The hydraulic assist turbocharger system of claim 43 wherein said valve member positioning means comprises a mode selector switch for applying a biasing force to said valve member during the engine starting procedure and for relieving said biasing force when the engine is running.

50. The hydraulic assist turbocharger system of claim 43 wherein said center housing includes a pair of axially spaced bearing bores respectively receiving and supporting a pair of axially spaced shaft bearings supported within said center housing and rotatably supporting said shaft;

said hydraulic turbine means including a boss formed by said center housing axially between and generally coaxial with said bearing bores, a nozzle sleeve secured within said boss and cooperating therewith to define at least two fluid inflow chambers communicating respectively with said supply conduits and further to define said at least two nozzles communicating respectively with said inflow chambers, and a turbine sleeve secured onto said shaft and defining an hydraulic turbine adjacent said nozzles and further cooperating with said boss to define an outflow chamber surrounding said hydraulic turbine and having an outlet therefrom sized for substantially immediate flooding thereof during supply of hydraulic fluid through at least one of said nozzles.

51. The hydraulic assist turbocharger system of claim 50 wherein said nozzle sleeve is press-fit into said boss in running clearance with said shaft, and wherein said turbine sleeve is press-fit onto said shaft in running clearance with said boss.

52. An hydraulic assist turbocharger, comprising:
a first turbine;
a compressor;
a shaft connected between said first turbine and said compressor;
a turbine housing having said first turbine therein;
a compressor housing having said compressor therein;
a center housing connected between said turbine and compressor housings;
shaft bearing means for rotatably supporting said shaft within said center housing;
means for lubricating said bearing means;
a nonventilated hydraulic turbine on said shaft within said center housing;
nozzle means within said center housing for passage of an hydraulic fluid under pressure into driving communication with said hydraulic turbine; and
heating means for elevating the temperature of at least selected portions of said center housing independent of supply of hydraulic fluid to said nozzle means and independent of said lubricating means.

53. The hydraulic assist turbocharger of claim 52 wherein said heating means comprises at least one heating element for elevating the temperature of said center housing in the vicinity of said nozzle means.

54. The hydraulic assist turbocharger of claim 53 wherein said heating means includes at least a second heating element for elevating the temperature of said center housing in the vicinity of said shaft bearing.

55. The hydraulic assist turbocharger system of claim 54 wherein said heating means comprises a plurality of said heating elements seated within cavities formed in said center housing.

56. The hydraulic assist turbocharger system of claim 52 wherein said nozzle means includes at least two nozzles, said center housing having at least two passages therein for separate flow of the hydraulic fluid to said nozzles, said heating means including at least one heating element for elevating the temperature of said center housing in the vicinity of one of said passages.

57. A turbocharger center housing assembly, comprising:
a center housing having a bore extending therethrough, said bore including at least two axially spaced and generally coaxial bearing bosses and a separate hydraulic turbine boss at a position generally between said bearing bosses and generally coaxial therewith;
said center housing further defining first passage means for conducting lubricant to said bearing bosses and second passage means for conducting an hydraulic fluid under pressure generally to said hydraulic turbine boss; and
heating means for selectively elevating the temperature of at least selected portions of said center housing independent of lubricant supply through said first passage means and independent of hydraulic fluid supply through said second passage means.

58. The turbocharger center housing of claim 57 wherein said heating means comprises a plurality of first heating elements for elevating the temperature of said bearing bosses, and at least one second heating element for elevating the temperature of said center housing in the vicinity of said second passage means.

59. The turbocharger center housing of claim 57 wherein said second passage means comprises at least two passages for separate supply of the hydraulic fluid to said hydraulic turbine boss.

60. The turbocharger center housing of claim 57 further including a nozzle sleeve seated within said hydraulic turbine boss and including nozzle means in flow communication with said second passage means.

61. The turbocharger center housing of claim 60 further including a shaft extending through said bearing bosses and said hydraulic turbine boss and said nozzle sleeve in running clearance with said nozzle sleeve, and a turbine sleeve carried on said shaft and defining an hydraulic turbine adjacent said nozzle means.

62. The turbocharger center housing of claim 61 wherein said nozzle sleeve cooperates with said hydraulic turbine boss to define at least one inflow chamber communicating with said passage means, and wherein said turbine sleeve cooperates with said hydraulic turbine boss to define an outflow chamber surrounding said hydraulic turbine.

63. A turbocharger center housing assembly, comprising:
a center housing having a bore extending therethrough, said bore including at least two axially spaced and generally coaxial bearing bosses and a separate hydraulic turbine boss at a position generally between said bearing bosses and generally coaxial therewith and having a pair of axially spaced radially inwardly extending walls at one end thereof and a radially inwardly extending wall at the other end thereof;
said center housing further defining first passage means for conducting lubricant to said bearing bosses and second passage means including at least two second passages for separately conducting an hydraulic fluid under pressure generally to said hydraulic turbine boss;
shaft bearing means supported within said bearing bosses;
a shaft extending through said bore and said shaft bearing means and said hydraulic turbine boss;
a nozzle sleeve secured into a portion of said hydraulic turbine boss in running clearance with said shaft and cooperating with said hydraulic turbine boss and the pair of axially spaced radially inwardly extending walls thereof to define at least two inflow chambers in separate communication with said at least two second passages, said nozzle sleeve further including at least two nozzles in separate communication with said at least two inflow chambers; and a turbine sleeve secured onto said shaft for rotation therewith and including an hydraulic turbine positioned closely adjacent said at least two nozzles, said turbine sleeve being in running clearance with said separate hydraulic turbine boss and cooperating with one of the pair of axially spaced radially inwardly extending walls at one end thereof and the radially inwardly extending wall at the other end thereof to define an outflow chamber encasing said hydraulic turbine.

64. The turbocharger center housing assembly of claim 63 further including heating means for selectively elevating the temperature of at least selected portions of said center housing independent of lubricant supply through said first passage means and independent of hydraulic fluid supply through said second passage means.

65. The turbocharger center housing of claim 64 wherein said heating means comprises a plurality of first heating elements for elevating the temperature of said bearing bosses, and at least one second heating element for elevating the temperature of said center housing in the vicinity of said second passage means.

66. A turbocharger center housing assembly, comprising:

a center housing having a bore extending therethrough, said bore including at least two axially spaced and generally coaxial bearing bosses and a separate hydraulic turbine boss at a position generally between said bearing bosses and generally coaxial therewith and having a pair of axially spaced radially inwardly extending walls at one end thereof and a radially inwardly extending wall at the other end thereof;

said center housing further defining first passage means for conducting lubricant to said bearing bosses and second passage means for conducting an hydraulic fluid under pressure generally to said hydraulic turbine boss;

shaft bearing means supported within said bearing bosses;

a shaft extending through said bore and said shaft bearing means and said hydraulic turbine boss;

a nozzle sleeve secured into a portion of said hydraulic turbine boss in running clearance with said shaft and cooperating with said hydraulic turbine boss and the pair of axially spaced radially inwardly extending walls thereof to define at least one inflow chamber in flow communication with said second passage means, said nozzle sleeve further including at least one nozzle in flow communication with said inflow chamber; and a turbine sleeve secured onto said shaft for rotation therewith and including an hydraulic turbine positioned closely adjacent said at least one nozzle, said turbine sleeve being in running clearance with said separate hydraulic turbine boss and cooperating with one of the pair of axially spaced radially inwardly extending walls at one end thereof and the radially inwardly extending wall at the other end thereof to define an outflow chamber encasing said hydraulic turbine.

67. The turbocharger center housing assembly of claim 66 further including heating means for selectively elevating the temperature of at least selected portions of said center housing independent of lubricant supply through said first passage means and independent of hydraulic fluid supply through said second passage means.

68. An hydraulic assist turbocharger system for supplying charge air to a combustion engine, comprising:

an hydraulic assist turbocharger having a first turbine driven by engine exhaust gases, a compressor rotatably driven by said first turbine for supplying charge air to the engine, and an hydraulic turbine for selective supplemental driving of said compressor;

hydraulic fluid supply means for selectively supplying an hydraulic fluid under pressure into rotatable driving communication with said hydraulic turbine;

fuel supply means for selectively supplying fuel to the engine;

sensing means for sensing engine speed and engine load and for generating a first parameter signal representative of engine speed and a second parameter signal representative of engine load; and master control means for receiving said first and second parameter signals and being responsive thereto for simultaneously controlling said fuel supply means to control engine fuel inflow and said hydraulic fluid supply means to control the level of supplemental driving of said compressor to thereby control engine air inflow.

69. The hydraulic assist turbocharger system of claim 68 wherein said fuel supply means includes a fuel flow regulator.

70. The hydraulic assist turbocharger system of claim 68 wherein said hydraulic fluid supply means includes pump means for providing an hydraulic fluid outflow, and a control valve for controllably coupling said hydraulic fluid outflow for flow into driving communication with said hydraulic turbine, said master control means including means for regulating operation of said control valve.

71. An hydraulic assist turbocharger system for supplying charge air to a combustion engine, comprising:

an hydraulic assist turbocharger having a first turbine driven by engine exhaust gases, a compressor rotatably driven by said first turbine for supplying charge air to the engine, and an hydraulic turbine for selective supplemental driving of said compressor:

hydraulic fluid supply means for selectively supplying an hydraulic fluid under pressure into rotatably driving communication with said hydraulic turbine, said hydraulic fluid supply means including pump means for providing an hydraulic fluid outflow, and a control valve for controllably coupling said hydraulic fluid outflow for flow into driving communication with said hydraulic turbine; said control valve including a movable valve component for controlling coupling of said hydraulic fluid outflow to said hydraulic turbine, and fluid pressure-responsive means for adjustably positioning said valve component;

fuel supply means for selectively supplying fuel to the engine;

sensing means for sensing at least one engine operating condition and for generating at least one parameter signal representative thereof; and master control means for receiving said at least one parameter signal and being responsive thereto for simultaneously controlling said fuel supply means to control engine fuel inflow and said hydraulic fluid supply means to control the level of supplemental driving of said compressor to thereby control engine air inflow, said master control means including means for regulating operation of said control valve and including means for generating a pilot fluid under predetermined pressure coupled to said pressure-responsive means to regulate operation of said control valve.

72. The hydraulic assist turbocharger system of claim 71 wherein said pilot fluid generating means includes a master control unit for generating a command signal in response to said at least one parameter signal, a pilot controller for receiving said command signal and including means for modulating the pressure of the pilot fluid in response thereto, said pressure-modulated pilot fluid being coupled to said pressure-responsive means of said control valve.

73. The hydraulic assist turbocharger system of claim 72 wherein said master control unit comprises a programmed electronic module for variably scheduling engine air-fuel ratio throughout a range of engine operating conditions.

74. The hydraulic assist turbocharger system of claim 72 wherein said pressure-responsive means of said control valve comprises a movable control piston and an actuator rod extending between said control piston and said valve component for movably positioning said valve component.

75. The hydraulic assist turbocharger system of claim 72 wherein said sensing means comprises an engine speed detector and an engine load detector.

76. The hydraulic assist turbocharger system of claim 68 wherein said hydraulic fluid supply means includes means for increasing the pressure of the hydraulic fluid supplied to said hydraulic turbine during an engine starting procedure to correspondingly increase supplemental driving of said compressor resulting in increased supply of charge air to the engine.

77. The hydraulic assist turbocharger system of claim 68 further including means for increasing the temperature of the hydraulic fluid supplied into driving communication with said hydraulic turbine during an engine starting procedure to increase the flow rate of the hydraulic fluid into driving communication with said hydraulic turbine during the starting procedure to correspondingly increase supplemental driving of said compressor resulting in increased supply of charge air to an engine.

78. An hydraulic assist turbocharger for supplying charge air to a combustion engine, comprising:

an hydraulic assist turbocharger having a first turbine driven by engine exhaust gases, a compressor rotatably driven by said first turbine for supplying charge air to the engine, and an hydraulic turbine for selective supplemental driving of said compressor;

hydraulic fluid supply means for selectively supplying an hydraulic fluid under pressure into rotatable driving communication with said hydraulic turbine, said hydraulic fluid supply means including pump means for supplying an hydraulic fluid outflow, and control valve means having a movable valve component for controllably coupling the hydraulic fluid outflow to said hydraulic turbine, said control valve means including fluid pressure responsive means for adjustably positioning said valve component;

fuel supply means for selectively supplying fuel to the engine;

first sensing means for sensing engine speed and for generating a first parameter signal representative thereof;

second sensing means for sensing engine load and for generating a second parameter signal representative thereof;

a master control unit responsive to said first and second parameter signals for generating a first command signal coupled to said fuel supply means for controlling operation thereof to control engine fuel inflow and for generating a second command signal;

a pilot controller having said second command signal coupled thereto and for movably positioning a pilot piston in response to said second command signal;

means for supplying a reference fluid at a predetermined reference pressure to said pilot controller; and a pilot fluid conduit coupled between said pilot controller and said fluid pressure responsive means of said control valve, said pilot piston being disposed between said reference fluid supply means and said pilot fluid conduit and movably positioned in response to said second command signal for permitting the reference fluid to flow into said pilot fluid conduit and for modulating the fluid pressure within said pilot fluid conduit to a pilot fluid pressure variable in accordance with said second command signal whereby said master control unit controls operation of said control valve to correspondingly regulate supplemental driving of said hydraulic turbine and engine air inflow.

79. The hydraulic assist turbocharger system of claim 78 wherein said hydraulic fluid supply means includes means for increasing the pressure of the hydraulic fluid supplied to said hydraulic turbine during an engine starting procedure to correspondingly increase supplemental driving of said compressor resulting in increased supply of charge air to the engine.

80. The hydraulic assist turbocharger system of claim 78 further including means for increasing the temperature of the hydraulic fluid supplied into driving communication with said hydraulic turbine during an engine starting procedure to increase the flow rate of the hydraulic fluid into driving communication with said hydraulic turbine during the starting procedure to correspondingly increase supplemental driving of said compressor resulting in increased supply of charge air to the engine.

81. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

providing at least two nozzles for separate passage of hydraulic fluid under pressure into driving communication with the hydraulic turbine;

controllably supplying hydraulic fluid under pressure for passage through said at least two nozzles during a range of engine run conditions;

supplying the hydraulic fluid under pressure through at least one of the nozzles while preventing supply of the hydraulic fluid under pressure to at least one other of the nozzles during an engine starting procedure; and decreasing the viscosity of the hydraulic fluid supplied to the at least one of the nozzles during the engine starting procedure.

82. The method of claim 81 further including the step of supplying an hydraulic fluid outflow at a flow rate directly proportional to engine speed during engine run conditions and during an engine starting procedure, said steps of supplying the fluid to the hydraulic turbine comprising controllably coupling the fluid outflow to the at least two nozzles during engine run conditions and preventing flow of the fluid outflow to at least one of the nozzles during an engine starting procedure.

83. The method of claim 81 wherein said viscosity decreasing step comprises heating the hydraulic fluid.

84. The method of claim 81 wherein the hydraulic turbine and the nozzles are positioned within a turbocharger center housing, and wherein said viscosity decreasing step comprises heating at least selected portions of the center housing for transfer of the heat to hydraulic fluid supplied to the hydraulic turbine.

85. The method of claim 84 wherein said center housing heating step comprises heating the center housing at least in the vicinity of fluid passage therethrough into driving communication with the at least one other of the nozzles.

86. The method of claim 85 wherein said heating step further includes heating the turbocharger center housing in the vicinity of bearings therein for rotatably supporting a turbocharger shaft to correspondingly heat and decrease the viscosity of lubricant for the shaft bearings.

87. The method of claim 81 wherein said fluid supplying steps include supplying the hydraulic fluid to the hydraulic turbine at a flow rate sufficient for rotatably driving the hydraulic turbine substantially fully submerged.

88. The method of claim 81 wherein said fluid supply step during engine run conditions includes the step of regulating the supply of hydraulic fluid to the hydraulic turbine in response to engine operating conditions representative of engine charge air inflow requirements.

89. The method of claim 81 wherein the system includes a selector valve, at least two supply conduits coupled from the selector valve for separate flow communication with the at least two nozzles, means for supplying an hydraulic fluid outflow to the selector valve, a valve member within the selector valve movable between a first position permitting passage of the fluid outflow to the at least two supply conduits and a second position preventing passage of the fluid outflow to at least one of the supply conduits and permitting passage of the fluid outflow to at least one other of the supply conduits, said fluid supplying step during engine run conditions comprising positioning the valve member in the first position and said fluid supplying step during an engine starting procedure comprising positioning the valve member in the second position.

90. The method of claim 81 wherein the system further includes engine fuel flow supply means and a master control unit, and further including the step of simultaneously controlling the fuel flow supply means and the supply of hydraulic fluid to the hydraulic turbine with the master control unit.

91. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

providing at least two nozzles for separate passage of hydraulic fluid under pressure into driving communication with the hydraulic turbine;

controllably supplying hyraulic fluid under pressure for passage through said at least two nozzles during a range of engine run conditions; and supplying the hydraulic fluid under pressure through at least one of the nozzles while preventing supply of the hydraulic fluid under pressure to at least one other of the nozzles during an engine starting procedure.

92. The method of claim 91 further including at the step of decreasing the viscosity of the hydraulic fluid supplied to the at least one of the nozzles during the engine starting procedure.

93. The method of claim 91 further including the step of supplying an hydraulic fluid outflow at a flow rate directly proportional to engine speed during engine run conditions and during an engine starting procedure, said steps of supplying the fluid to the hydraulic turbine comprising controllably coupling the fluid outflow to the at least two nozzles during engine run conditions and preventing flow of the fluid outflow to at least one of the nozzles during an engine starting procedure.

94. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

positioning the hydraulic turbine within a turbocharger center housing and further positioning at least one nozzle within the center housing for passage of hydraulic fluid under pressure into rotatable driving communication with the hydraulic turbine;

controllably supplying hydraulic fluid under pressure to the at least one nozzle during a range of engine run conditions and during an engine starting procedure; and decreasing the viscosity of the hydraulic fluid supplied to the at least one nozzle by heating at least portions of the center housing for an engine starting procedure, said heating step further including directly heating the turbocharger center housing in the vicinity of bearings therein for rotatably supporting a turbocharger shaft to correspondingly heat and decrease the viscosity of lubricant for the shaft bearings.

95. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

positioning the hydraulic turbine within a turbocharger center housing and further positioning at least one nozzle within the center housing for passage of hydraulic fluid under pressure into rotatable driving communication with the hydraulic turbine, said positioning step including positioning at least two of the nozzles in the center housing;

controllably supplying hydraulic fluid under pressure to the at least one nozzle during a range of engine run conditions and during an engine starting procedure, and said fluid supplying step comprising supplying the hydraulic fluid under pressure through at least one of the nozzles while preventing supply of the hydraulic fluid under pressure to at least one other of the nozzles during an engine starting procedure; and decreasing the viscosity of the hydraulic fluid supplied to the at least one nozzle by heating at least portions of the center housing for an engine starting procedure.

96. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

positioning the hydraulic turbine within a turbocharger center housing and further positioning at least one nozzle within the center housing for passage of hydraulic fluid under pressure into rotatable driving communication with the hydraulic turbine;

controllably supplying hydraulic fluid under pressure to the at least one nozzle during a range of engine run conditions and during an engine starting procedure;

decreasing the viscosity of the hydraulic fluid supplied to the at least one nozzle by heating at least portions of the center housing for an engine starting procedure; and decreasing the available nozzle flow area open to hydraulic fluid passage during an engine starting procedure.

97. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplementally driving of the compressor, said method comprising the steps of:

positioning the hydraulic turbine within a turbocharger center housing and further positioning at least one nozzle within the center housing for passage of hydraulic fluid under pressure into rotatable driving communication with the hydraulic turbine;

controllably supplying hydraulic fluid under pressure to the at least one nozzle during a range of engine run conditions and during an engine starting procedure; and increasing the pressure of the hydraulic fluid supplied to the hydraulic turbine during an engine starting procedure, said pressure increasing step comprising decreasing the available nozzle flow area open to hydraulic fluid passage during an engine starting procedure.

98. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

supplying an hydraulic fluid under pressure to a fluid control valve operable to controllably couple the hydraulic fluid into rotatable driving communication through at least one nozzle with the hydraulic turbine throughout a range of engine operating conditions;

supplying fuel to the engine via a fuel flow regulator;

sensing at least one engine operating condition and generating a parameter signal representative thereof and coupling the generated parameter signal to a master control unit;

generating at least one command signal with the master control unit in response to the generated parameter signal and coupling the at least one command signal to the fuel flow regulator to control engine fuel flow and to the fluid control valve to control supplemental driving of the turbocharger compressor and thereby control engine charge air inflow; and increasing the pressure of hydraulic fluid supplied to the hydraulic turbine during an engine starting procedure by decreasing the available nozzle flow area open to fluid passage.

99. The method of claim 98 further including the step of decreasing the viscosity of hydraulic fluid supplied to the hydraulic turbine during an engine starting procedure.

100. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of;

supplying an hydraulic fluid under pressure to a fluid control valve operable to controllably couple the hydraulic fluid into rotatable driving communication with the hydraulic turbine throughout a range of engine operating conditions;

supplying fuel to the engine via a fuel flow regulator;

sensing at least one engine operating condition and generating a parameter signal representative thereof and coupling the generated parameter signal to a master control unit, said sensing step comprising sensing at least engine speed and engine load and generating parameter signals representative thereof coupled to the master control unit; and generating at least one command signal with the master control unit in response to the generated parameter signal and coupling the at least one command signal to the fuel flow regulator to control engine fuel flow and to the fluid control valve to control supplemental driving of the turbocharger compressor and thereby control engine charge air inflow.

101. In an hydraulic assist turbocharger system including an hydraulic assist turbocharger having a first turbine driven by exhaust gases from a combustion engine for rotatably driving a compressor which supplies charge air to the engine, and an hydraulic turbine for supplementally driving the compressor, a method of supplying hydraulic fluid under pressure into rotatable driving communication with the hydraulic turbine to control supplemental driving of the compressor, said method comprising the steps of:

supplying an hydraulic fluid under pressure to a fluid control valve operable to controllably couple the hydraulic fluid into rotatable driving communication with the hydraulic turbine throughout a range of engine operating conditions;

supplying fuel to the engine via a fuel flow regulator;

sensing at least one engine operating condition and generating a parameter signal representative thereof and coupling the generated parameter signal to a master control unit; and generating at least one command signal with the master control unit in response to the generated parameter signal and coupling the at least one command signal to the fuel flow regulator to control engine fuel flow and to the fluid control valve to control supplemental driving of the turbocharger compressor and thereby control engine charge air inflow, the control valve including a pressure responsive valve component for controlling hydraulic fluid flow to the hydraulic turbine, and further including a pilot controller for modulating the pressure of a pilot fluid coupled to the pressure responsive valve component wherein said command signal generating step comprises coupling the command signal to the pilot controller for controlling operation thereof to modulate the pressure of the pilot fluid.

102. The hydraulic assist turbocharger system of claim 29 wherein said hydraulic fluid supply means further includes at least one engine driven pump for providing the supply of hydraulic fluid under pressure.

103. The method of claim 99 wherein the step of decreasing the viscosity of hydraulic fluid supplied to the hydraulic turbine during an engine starting procedure includes heating the hydraulic fluid.

* * * * *